(12) United States Patent
Sakumoto et al.

(10) Patent No.: US 9,807,071 B2
(45) Date of Patent: Oct. 31, 2017

(54) INFORMATION PROCESSING APPARATUS, INFORMATION PROCESSING SYSTEM, INFORMATION PROCESSING METHOD AND COMPUTER PROGRAM

(71) Applicant: SONY CORPORATION, Minato-ku (JP)

(72) Inventors: Koichi Sakumoto, Tokyo (JP); Taizo Shirai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 61 days.

(21) Appl. No.: 14/366,350

(22) PCT Filed: Oct. 10, 2013

(86) PCT No.: PCT/JP2013/006056
§ 371 (c)(1),
(2) Date: Jun. 18, 2014

(87) PCT Pub. No.: WO2014/068862
PCT Pub. Date: May 8, 2014

(65) Prior Publication Data
US 2014/0365771 A1 Dec. 11, 2014

(30) Foreign Application Priority Data

Oct. 31, 2012 (JP) .................................. 2012-240453

(51) Int. Cl.
*H04L 29/06* (2006.01)
*G06F 21/31* (2013.01)
(Continued)

(52) U.S. Cl.
CPC .............. *H04L 63/08* (2013.01); *G06F 21/31* (2013.01); *H04L 9/0861* (2013.01); *H04L 9/30* (2013.01); *H04L 9/32* (2013.01); *H04L 9/3271* (2013.01)

(58) Field of Classification Search
None
See application file for complete search history.

(56) References Cited

U.S. PATENT DOCUMENTS 6,185,612 B1 * 2/2001 Jensen .................... H04L 41/12
709/220
6,282,535 B1 * 8/2001 Pham ................ G06F 17/30569
707/756

(Continued)

FOREIGN PATENT DOCUMENTS

JP 2001-216360 8/2001
JP 2002-091303 3/2002

(Continued)

OTHER PUBLICATIONS

Simson L. Garfinkel ("Email-Based Identification and Authentication: An Alternative to PKI?", "http://ieeexplore.ieee.org/stamp/stamp.jsp?arnumber=1253564", 2003).*

(Continued)

*Primary Examiner* — Saleh Najjar
*Assistant Examiner* — Simon Kanaan
(74) *Attorney, Agent, or Firm* — Oblon, McClelland, Maier & Neustadt, L.L.P.

(57) ABSTRACT

An information processing apparatus that controls a display to display a first user interface including a first input field configured to receive identification information and a second input field configured to receive a public key; and controls transmitting identification information received at the first input field and a public key received at the second input field to another information processing apparatus for registration at the another information processing apparatus.

20 Claims, 13 Drawing Sheets

(51) Int. Cl.
*H04L 9/08* (2006.01)
*H04L 9/30* (2006.01)
*H04L 9/32* (2006.01)

(56) References Cited

U.S. PATENT DOCUMENTS

| | | | |
|---|---|---|---|
| 6,353,887 B1* | 3/2002 | Cotugno | G06F 21/6236 |
| | | | 713/165 |
| 6,950,808 B1 | 9/2005 | Kyojima et al. | |
| 9,083,529 B1* | 7/2015 | Statica | H04L 9/0822 |
| | | | 726/28 |
| 9,094,192 B2* | 7/2015 | Kim | H04L 63/06 |
| 9,178,700 B2* | 11/2015 | Sakumoto | H04L 9/3093 |
| 2001/0021251 A1* | 9/2001 | Kasai | G06F 21/608 |
| | | | 380/201 |
| 2002/0040431 A1 | 4/2002 | Kato et al. | |
| 2004/0172534 A1 | 9/2004 | Ogata | |
| 2008/0231899 A1* | 9/2008 | Morimoto | G06F 3/1204 |
| | | | 358/1.15 |
| 2010/0121928 A1* | 5/2010 | Leonard | H04L 63/1433 |
| | | | 709/206 |
| 2012/0233457 A1 | 9/2012 | Zaverucha | |
| 2014/0108789 A1* | 4/2014 | Phatak | G06F 21/34 |
| | | | 713/156 |
| 2014/0108798 A1* | 4/2014 | Shirai | H04L 63/0823 |
| | | | 713/167 |

FOREIGN PATENT DOCUMENTS

| | | |
|---|---|---|
| JP | 2003-69560 A | 3/2003 |
| JP | 2003-323477 A | 11/2003 |
| JP | 2004-240764 | 8/2004 |
| JP | 2007-22075 | 8/2007 |
| JP | 2011-254155 | 12/2011 |

OTHER PUBLICATIONS

International Search Report issued Jan. 23, 2014 in PCT/JP2013/006056.
T. Ylonen SSH Communications Security Corp. C. Lonvick T et al., "SSH Authentication Protocol draft-ietf-secsh- userauth-27.txt", vol. secsh, No. 27, XP015038947, (Mar. 14, 2005), pp. 1-17.
William Stallings, "Key Management; Other Public-Key Cryptosystems", Cryptography and Network Security, XP055095445, (Dec. 31, 2003), pp. 286-287.
Anonymous, "Public—key cryptography—Wikipedia, the free encyclopedia", retrieved from the Internet: URL:http://en.wikipedia.org/w/index.php?title=Public-key_cryptography &oldid=519946247, [retrieved on Jan. 10, 2014], XP055095765, (Oct. 26, 2012), pp. 1-12.
E. Rescorla, RTFM, et al., "A Survey of Authentication Mechanisms; draft-iab-auth-mech-07.txt", Internet Engineering Task Force, IETF; Standard Working Draft, Internet Society (I SOC), No. 7, [retrieved on Feb. 28, 2010], XP015066928, pp. 1-60.
Office Action issued May 10, 2016 to Japanese Patent Application No. 2012-240453, with English translation.
Office Action issued May 19, 2016 to Chinese Patent Application No. 201380010505.X, with English translation.
Tatsuaki Okamoto, et al., Mathematics of Series/Information Science, Modern Cipher, Japan, Industry Book Co Ltd., Jun. 30, 1997, Second Printing of First Version, p. 155-159.
Wang Jinheng, "SSH Security Authentication Based on the Key", Computer & Telecommunication, vol. 08, 2011, Aug. 31, 2011.
Office Action issued Dec. 6, 2016 in Japanese Patent Application No. 2012-240453 (with English translation).

* cited by examiner

[Fig. 1]
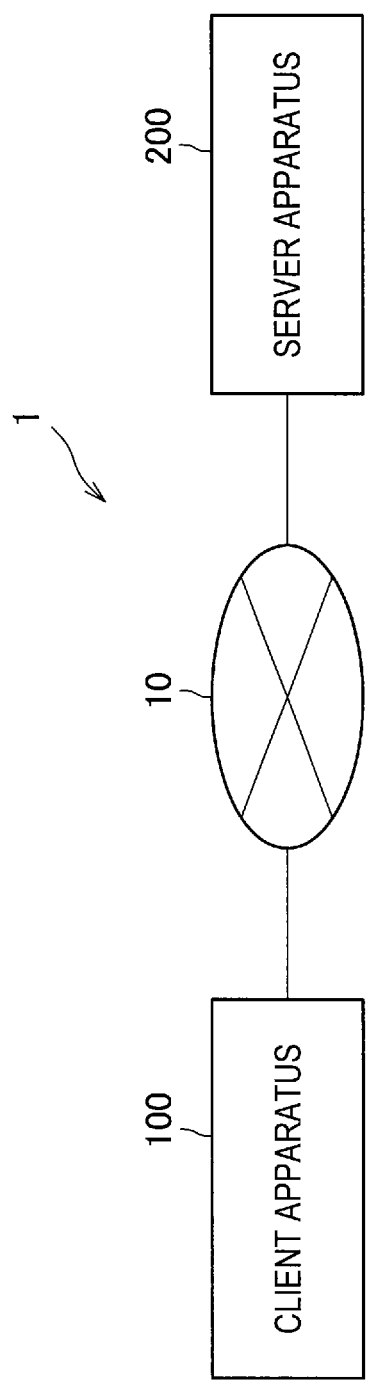

[Fig. 2]
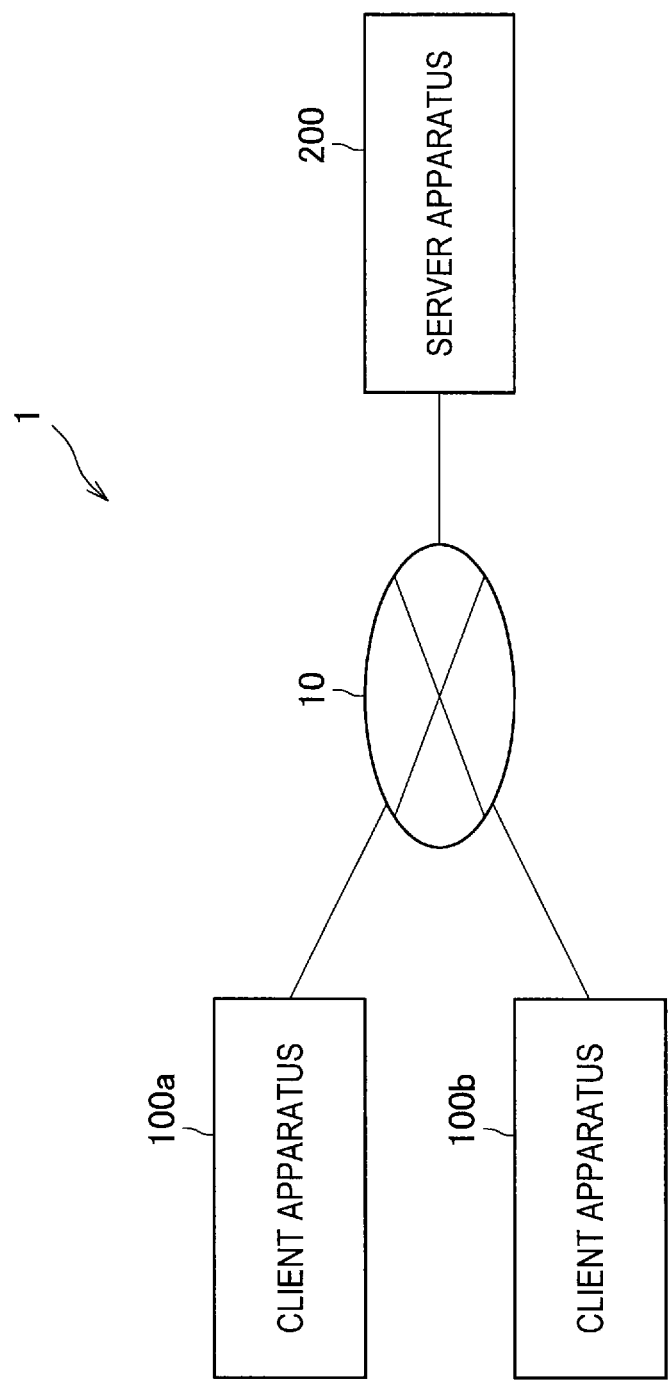

[Fig. 3]
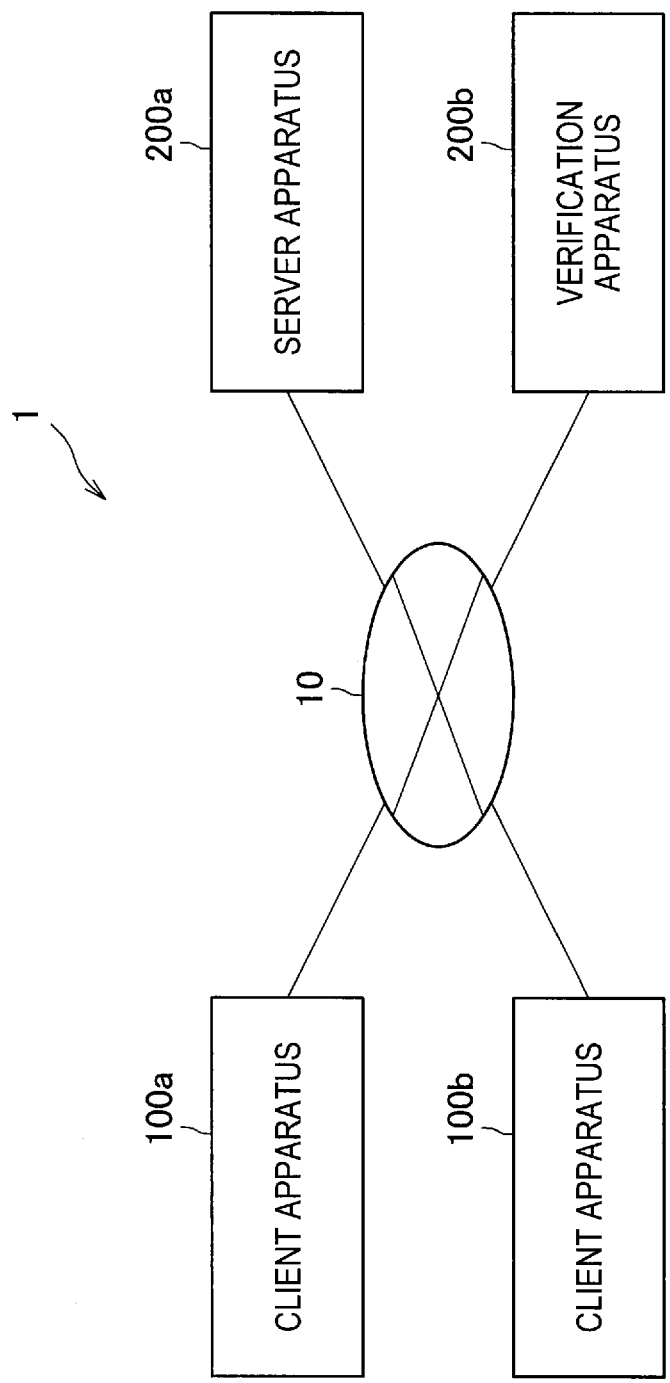

[Fig. 4]
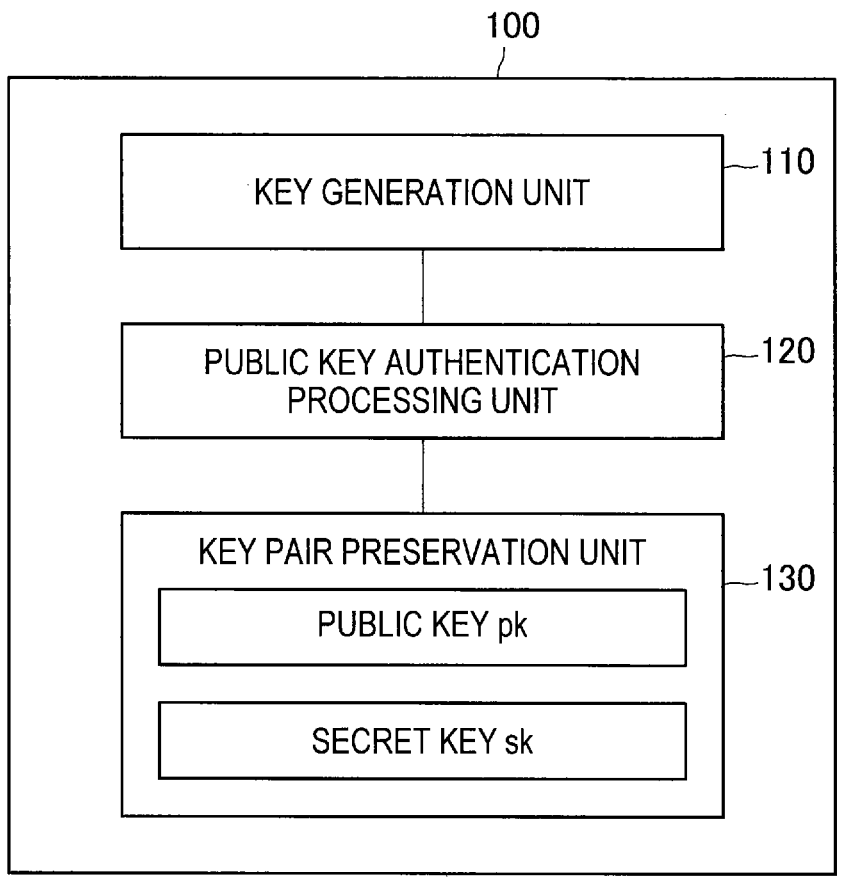
[Fig. 5]
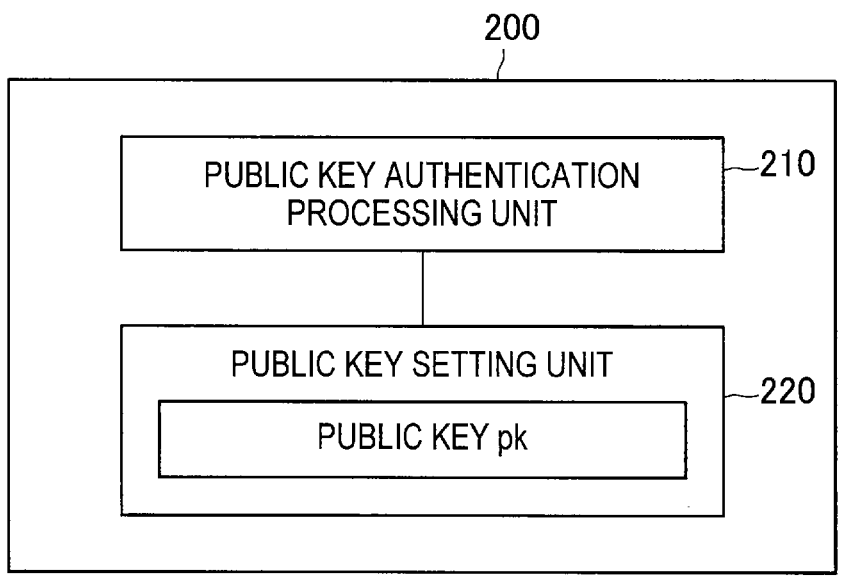

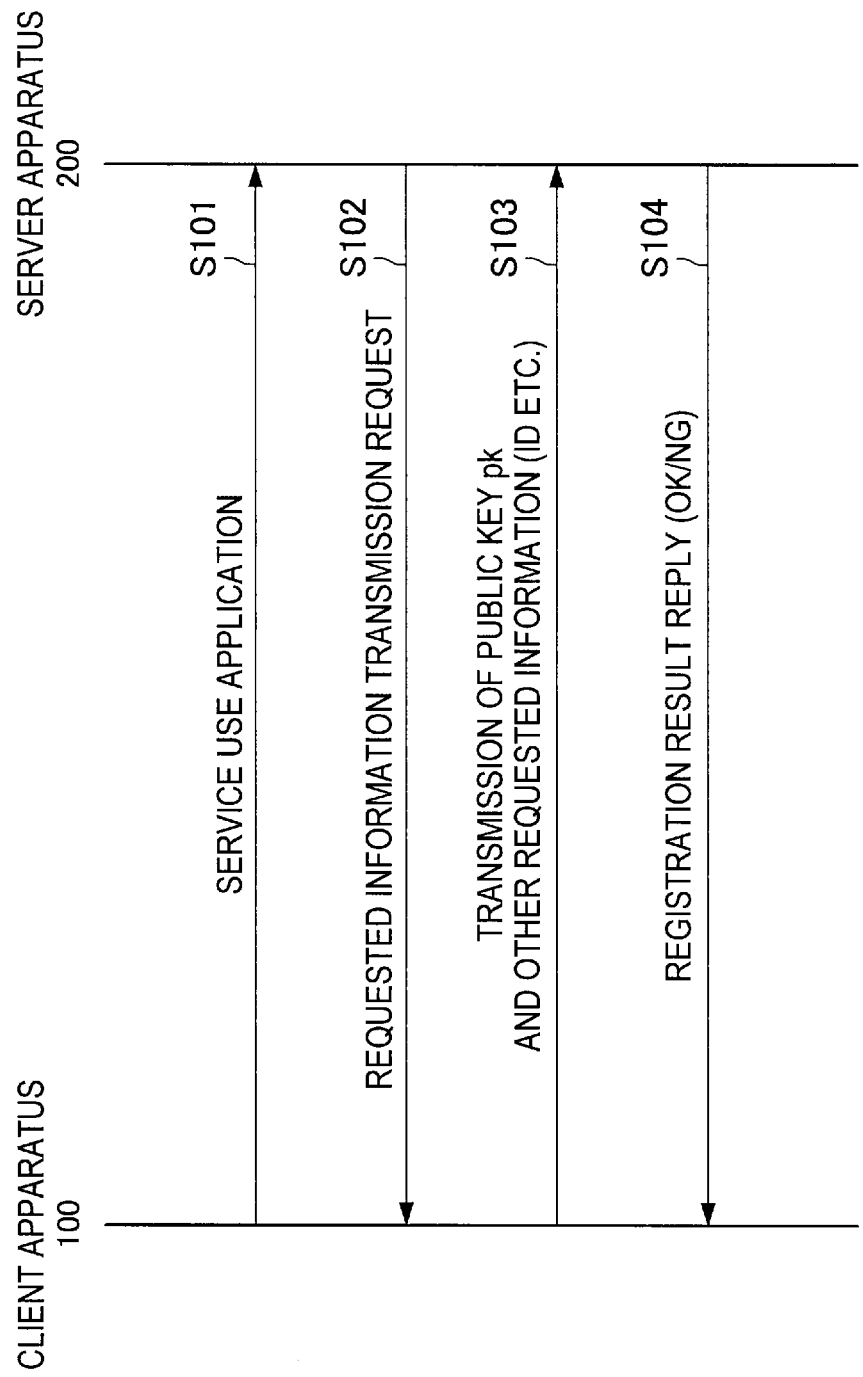

[Fig. 7]
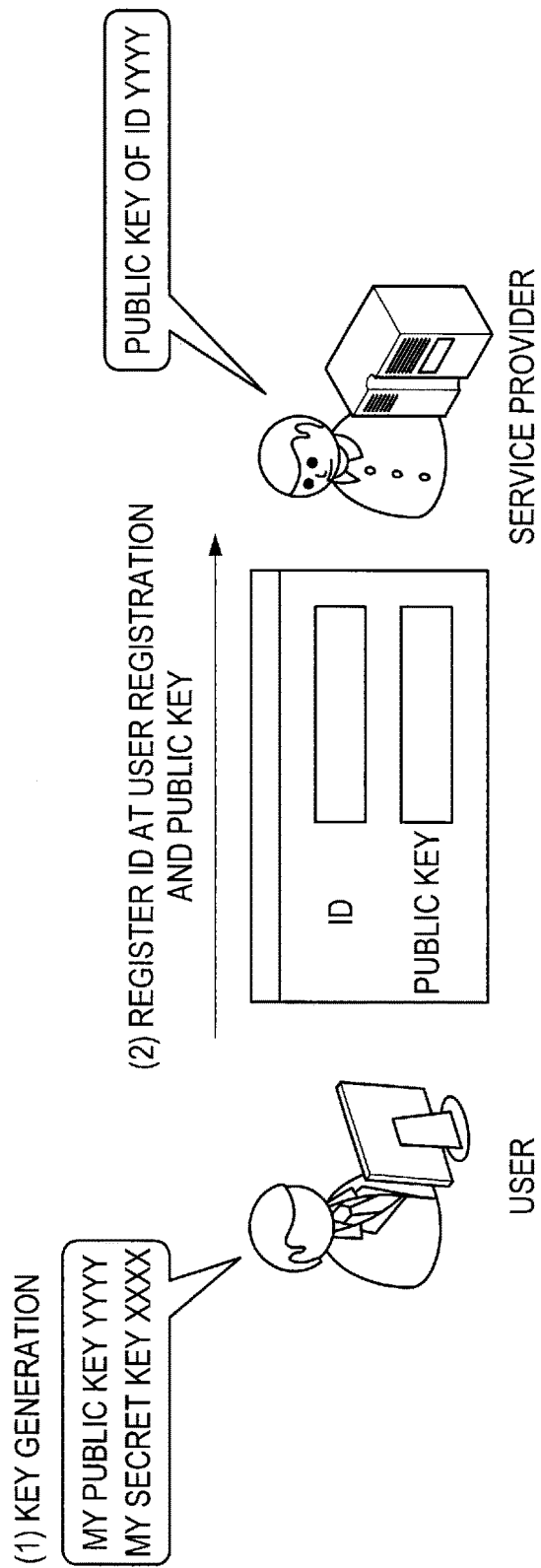

[Fig. 8]
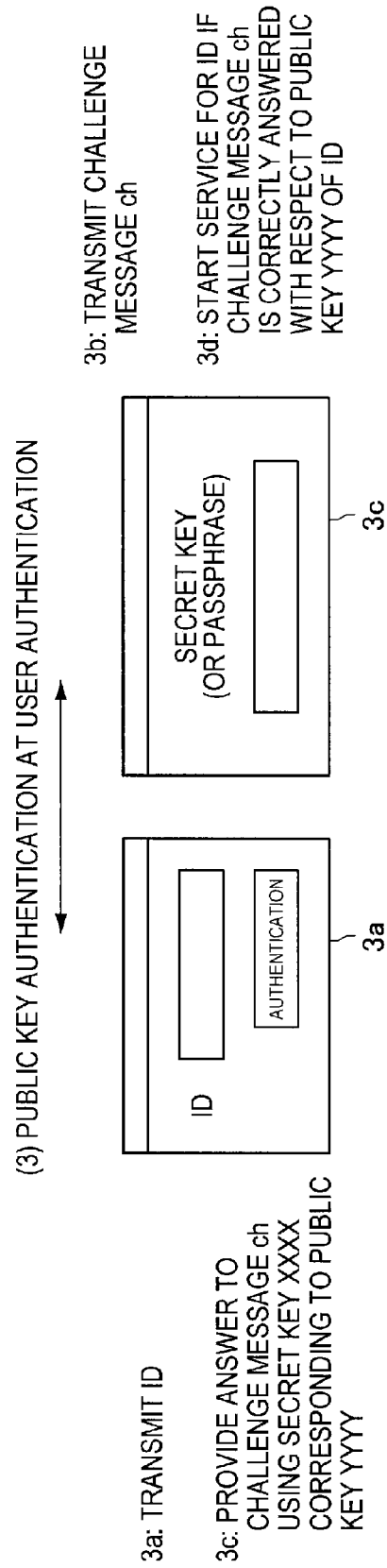

[Fig. 9]
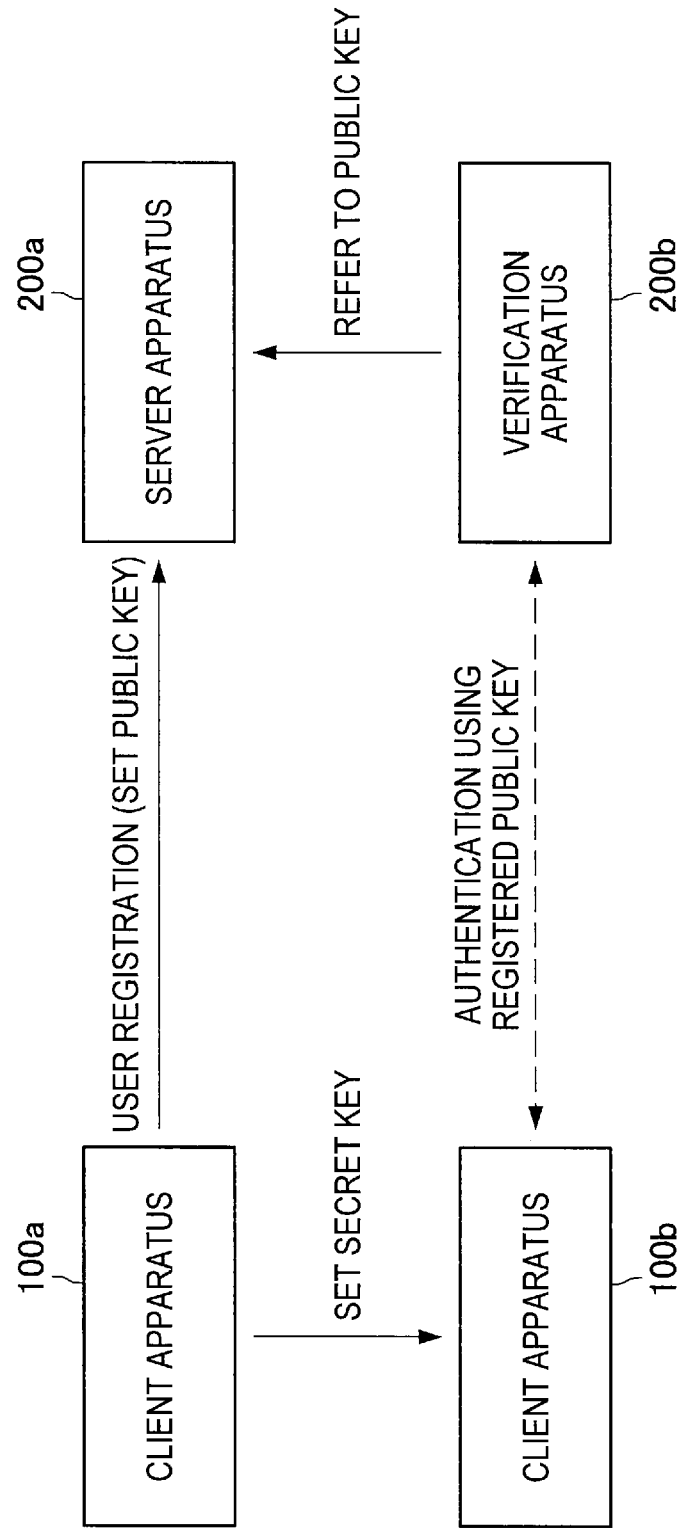

[Fig. 10]
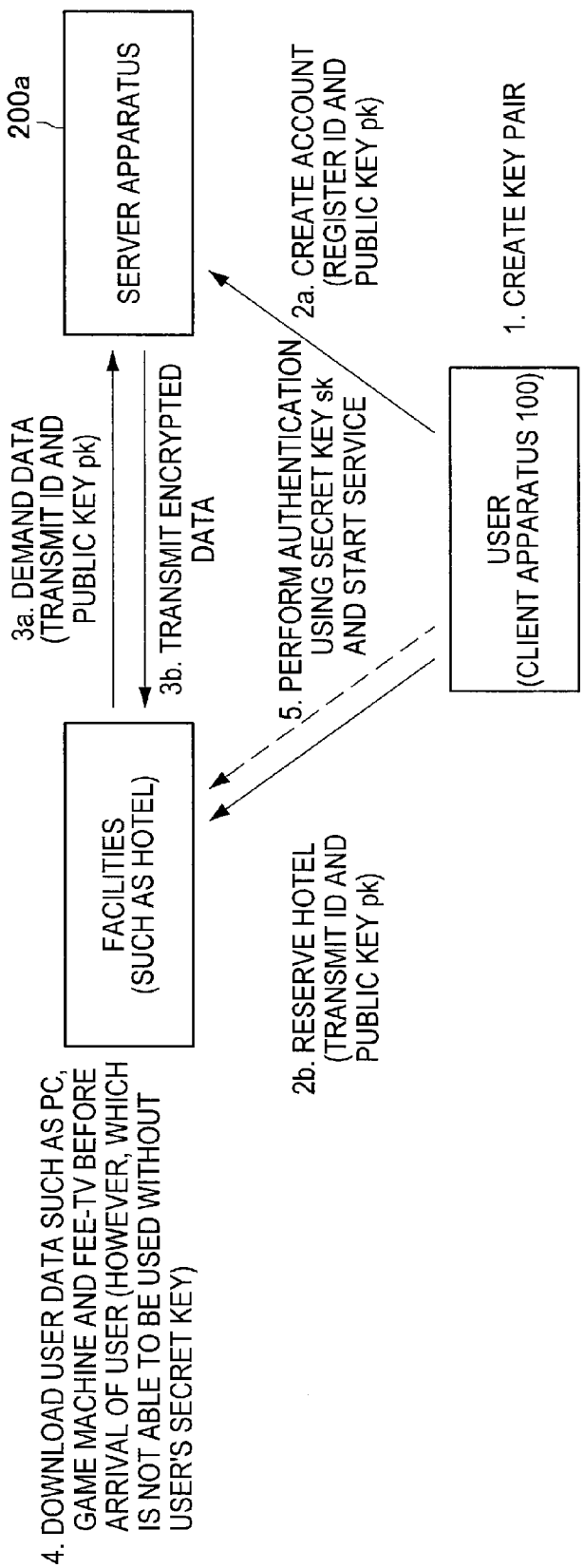

[Fig. 11]
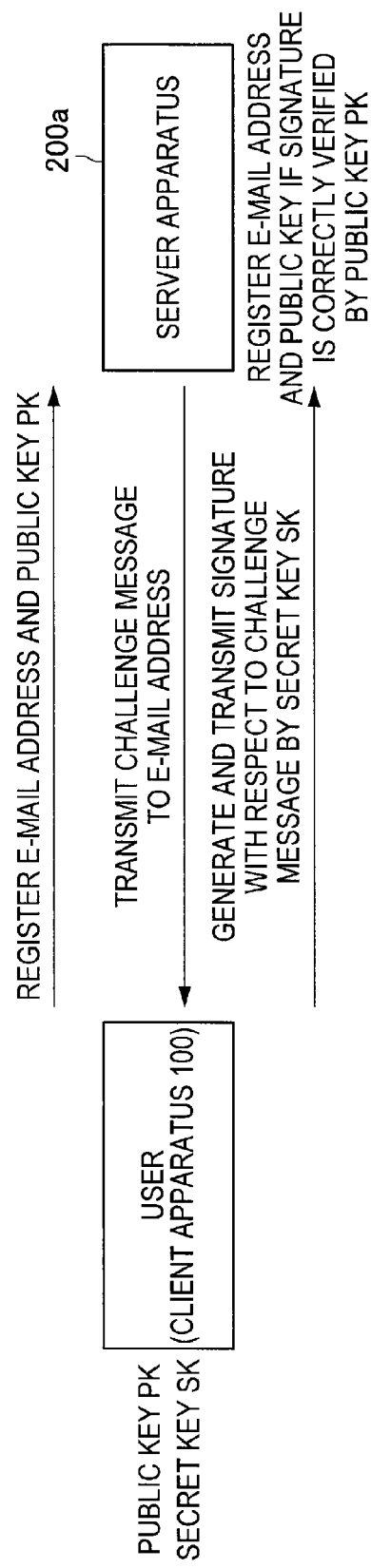

[Fig. 12]
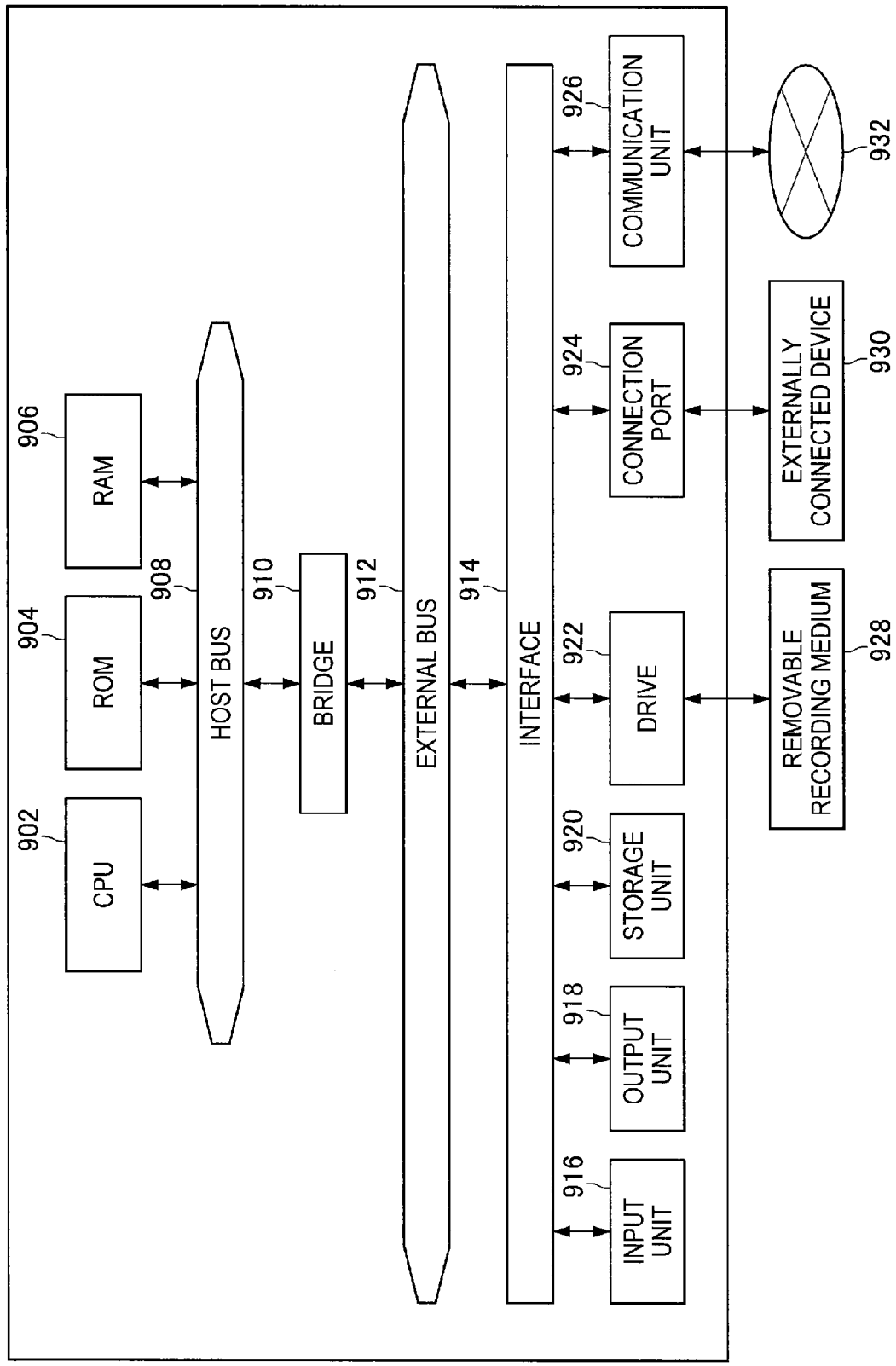

[Fig. 13]
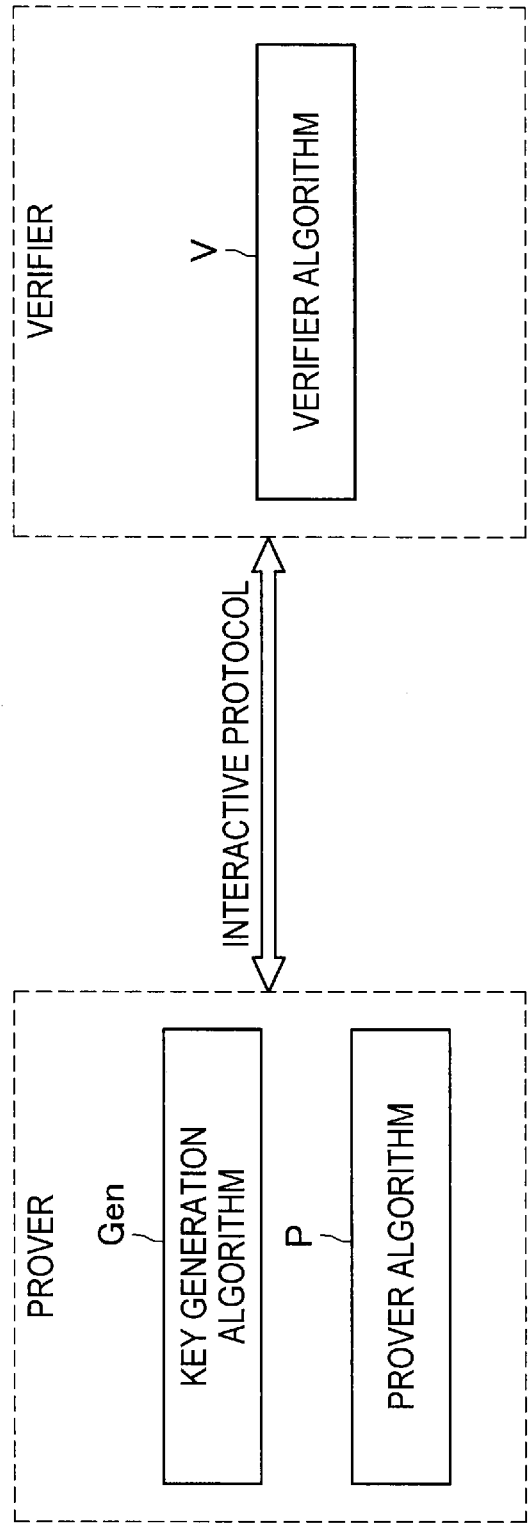

[Fig. 14]
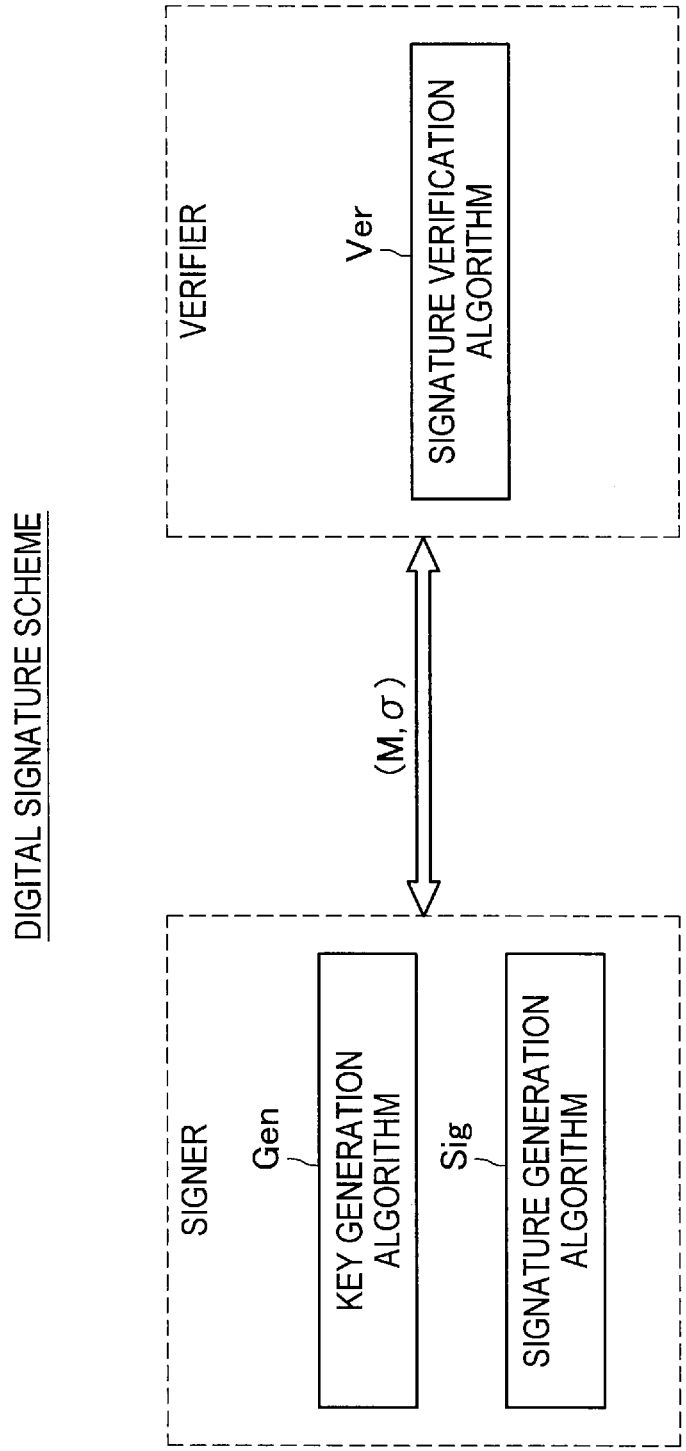

INFORMATION PROCESSING APPARATUS, INFORMATION PROCESSING SYSTEM, INFORMATION PROCESSING METHOD AND COMPUTER PROGRAM

TECHNICAL FIELD

The present disclosure relates to an information processing apparatus, an information processing system, an information processing method and a computer program.

The present disclosure contains subject matter related to that disclosed in Japanese Priority Patent Application JP 2012-240453 filed in the Japan Patent Office on Oct. 31, 2012, the entire content of which is hereby incorporated by reference.

BACKGROUND ART

Along with the popularization of the Internet, web services to provide various services on the web by the Internet become popular. Authentication by the user ID and password is generally used for user authentication in web services. The user registers the user ID and password in advance in a server that provides a web service, and the user inputs the user ID and password by a browser or the like when using the web service. The server performs user authentication depending on whether the input user ID and password match the user ID and password registered in advance.

Especially, since a password is input to authenticate the user, it is secret information which has a high degree of secrecy and which has to be strictly managed on both the user side and the server side. That is, the server side is requested to strictly manage a password registered by the user such that it is not leaked, and the user side is requested to strictly manage the password such that the user does not forget the password and leak it to others.

Moreover, for example, there is JP 2003-69560 that describes a technique to ensure identification. JP 2003-69560 describes a technique of ensuring a link between a public key and a terminal by terminal authentication by the use of the telephone number.

CITATION LIST

Patent Literature

PTL 1: JP 2003-69560A

SUMMARY

Technical Problem

In existing web services, it is requested to transmit a password which is user's secret information to the server side. On the server side, it costs much to strictly manage the password which is user's secret information, and, on the user side, it is requested to strictly manage the password. Further, for example, in the case of logging in a malicious site, there is a risk that the password is stolen. To reduce this risk, although an operation to set a different password for each web service is recommended, in a case where a different password is set for each web service, the cost of password management further increases depending on the user.

Therefore, the present disclosure provides a new improved information processing apparatus, information processing system, information processing method and computer program that can perform secure user authentication while reducing the cost of managing user's secret information.

Solution to Problem

According to one exemplary embodiment, the disclosure is directed to an information processing apparatus that controls a display to display a first user interface including a first input field configured to receive identification information and a second input field configured to receive a public key; and controls transmitting identification information received at the first input field and a public key received at the second input field to another information processing apparatus for registration at the another information processing apparatus.

According to another exemplary embodiment, the disclosure is directed to an information processing method performed by an information processing apparatus. The method including controlling a display to display a user interface including a first input field configured to receive identification information and a second input field configured to receive a public key; and controlling a communication interface to transmit identification information received at the first input field and a public key received at the second input field to another information processing apparatus for registration at the another information processing apparatus.

According to another exemplary embodiment, the disclosure is directed to a non-transitory computer-readable medium including computer program instructions, which when executed by an information processing apparatus, cause the information processing apparatus to: control a display to display a user interface including a first input field configured to receive identification information and a second input field configured to receive a public key; and control transmitting identification information received at the first input field and a public key received at the second input field to another information processing apparatus for registration at the another information processing apparatus.

According to another exemplary embodiment, the disclosure is directed to an information processing apparatus that transmits instructions to another information processing apparatus instructing the another information processing apparatus to display a user interface including a first input field configured to receive identification information and a second input field configured to receive a public key; receives, from the another information processing apparatus, identification information input to the first input field and a public key received at the second input field; and registers the identification information in association with the public key.

According to another exemplary embodiment, the disclosure is directed to an information processing method performed by an information processing apparatus. The method including transmitting instructions to another information processing apparatus instructing the another information processing apparatus to display a user interface including a first input field configured to receive identification information and a second input field configured to receive a public key; receiving, from the another information processing apparatus, identification information input to the first input field and a public key received at the second input field; and registering the identification information in association with the public key.

According to another exemplary embodiment, the disclosure is directed to a non-transitory computer-readable medium including computer program instructions, which when executed by an information processing apparatus, cause the information processing apparatus to: transmit instructions to another information processing apparatus instructing the another information processing apparatus to display a user interface including a first input field configured to receive identification information and a second input field configured to receive a public key; receive, from the another information processing apparatus, identification information input to the first input field and a public key received at the second input field; and register the identification information in association with the public key.

According to another exemplary embodiment, the disclosure is directed to an information processing method. The method including displaying, by a first information processing apparatus, a user interface including a first character input field configured to receive identification information and a second character input field configured to receive a public key; transmitting, by the first information processing apparatus, identification information received at the first character input field and a public key received at the second character input field to a second information processing apparatus; receiving, by the second information processing apparatus, the identification information and the public key from the first information processing apparatus; and registering, by the second information processing apparatus, the identification information in association with the public key.

Advantageous Effects of Invention

As described above, according to embodiments of the present disclosure, it is possible to provide a new improved information processing apparatus, information processing system, information processing method and computer program that can perform secure user authentication while reducing the cost of managing user's secret information.

BRIEF DESCRIPTION OF DRAWINGS

FIG. 1 is an explanatory diagram illustrating an entire configuration example of an information processing system 1 according to an embodiment of the present disclosure.

FIG. 2 is an explanatory diagram illustrating an entire configuration example of the information processing system 1 according to an embodiment of the present disclosure.

FIG. 3 is an explanatory diagram illustrating an entire configuration example of the information processing system 1 according to an embodiment of the present disclosure.

FIG. 4 is an explanatory diagram illustrating to functional configuration example of a client apparatus 100 according to an embodiment of the present disclosure.

FIG. 5 is an explanatory diagram illustrating a functional configuration example of a server apparatus 200 according to an embodiment of the present disclosure.

FIG. 6 is a flowchart illustrating an operation example of the information processing system 1 according to an embodiment of the present disclosure.

FIG. 7 is an explanatory diagram illustrating a user authentication processing example using a public key registered in the server apparatus 200.

FIG. 8 is an explanatory diagram illustrating a user authentication processing example using a public key registered in the server apparatus 200.

FIG. 9 is an explanatory diagram illustrating a user authentication processing example using a public key registered in a server apparatus 200a according to an embodiment of the present disclosure.

FIG. 10 is an explanatory diagram illustrating a user authentication processing example using a public key registered in the server apparatus 200 according to an embodiment of the present disclosure.

FIG. 11 is an explanatory diagram illustrating a user authentication processing example using a public key registered in the server apparatus 200 according to an embodiment of the present disclosure.

FIG. 12 is an explanatory diagram illustrating a hardware configuration example.

FIG. 13 is an explanatory diagram to describe a configuration of an algorithm according to a public key authentication scheme.

FIG. 14 is an explanatory diagram to describe a configuration of an algorithm according to a digital signature scheme.

DESCRIPTION OF EMBODIMENTS

With reference to the accompanying drawing, a preferred embodiment of the present disclosure is described below in detail. Also, in this specification and the drawings, the same reference numerals are assigned to components that substantially have the same functional configurations and thereby an overlapping explanation is omitted.

Also, the explanation is given in the following order.
1. Example of web service in the related art
(Example of authentication by user ID and password)
(Example of ticket reservation system)
(Example of locking/unlocking system)
(Problem of system in the related art)
2. One embodiment of the present disclosure
(Registration of public key)
(System configuration example)
(Configuration example of client apparatus)
(Configuration example of server apparatus)
(Operation example of information processing system)
(User authentication processing example (1))
(User authentication processing example (2))
(User authentication processing example (3))
(Expansion example)
3. hardware configuration example
4. Conclusion 1. Example of Web Service in the Related Art Before describing a preferred embodiment of the present disclosure in detail, first, an example of identification processing using a password used in a web service in the related art is described. Subsequently, a problem in identification processing using a password used in a web service in the related art is described.

(Example of Authentication by User ID and Password)

The most general identification processing used by a web service in the related art is authentication processing by the user ID and password. The user who tries to use a certain web service registers a password voluntarily decided at the time of user registration in a server that provides the web service. Subsequently, in the case of using the web service, the user inputs the user ID and the password by a browser or the like. On the web service side, the server determines whether the user ID and the password match the registered ones, and, when they are matched, the user is permitted to use the web service.

Here, in the case of a web service in which high security is requested, instead of causing the user to register a password, the web service side may generate a password and notify the generated password to the user. In any case, in authentication by the user ID and password, it is requested to register a password on the server side and transmit the user ID and the password from the client side to the server side at the time of authentication.

(Example of Ticket Reservation System)

Next, a ticket reservation system is described as an example of a web service in the related art. When reserving a ticket, the user makes a seat reservation of a movie theater or airline ticket via the web or the like, and accepts a password and identifier temporarily issued to the user with e-mail or the like. Subsequently, at the time of admittance and boarding, for example, by communicating the issued password and identifier to an attendant in a reception counter or the like, the user can receive an actual ticket. Further, by recording the ticket in advance in an IC card and holding the IC card, it is possible to automatically go through a ticket gate.

Also, as a developed form of the ticket reservation system, an authentication system is provided in which the convenience is improved such that machine authentication is possible by linking member information registered in advance and reservation information.

(Example of Locking and Unlocking System)

As a system in which a password is issued like a web service in the related art, there is a locking and unlocking system in a coin-operated locker or hotel. For example, there is a coin-operated locker system in which a password is issued when luggage is left and it is locked, and it is unlocked by inputting the password at the time of reception. Moreover, there is a coin-operated locker system in which an IC card held by the user is used as a key, instead of a key provided in the locker.

Moreover, for example, there is a system in which a magnetic card is distributed in a reception desk at hotel check-in and the door of a room is unlocked by the magnetic card. Since the key recorded in the magnetic card is nullified when a given date passes, there is no problem even if a lodger forgets rerunning the magnetic card. Moreover, there is a system using an application of a smartphone that uses a common key authentication scheme, instead of the room key.

(Problem of System in the Related Art)

However, in this authentication by the user ID and password, on the server side, it costs much to strictly manage the password which is user's secret information. Moreover, the user side is requested to strictly manage the password, and, for example, in the case of logging in a malicious site (e.g., fishing site), there is a risk that the password which is strictly managed is stolen. For example, when the user sets a different password for each web service in order to reduce these risks, the cost of password management further increases for the user.

Moreover, since the manual entry of a password and identifier is requested in a ticket reservation system in the related art when the user receives a ticket, the convenience for the user decreases. Moreover, in the ticket reservation system in the related art, there is a risk that, when the password and the identifier are sent by e-mail at the time of reservation, the password and the identifier are stolen by the malicious third party at the time of transmission of the e-mail.

In addition, in the ticket reservation system in the related art, there is a problem that staffs who confirm tickets are demanded since actual tickets for entrance are issued. In addition, in a case where a ticket is recorded in an IC card and simple authentication based on only the identification number of the IC card is performed, there is a problem that counterfeit is performed in a relatively easy manner, and, in a case where authentication based on secret information embedded in the IC card is performed to improve security, a procedure of safely embedding the secret information in advance in the IC card is caused. By embedding the secret information in advance in the IC card, there are problems that other business operators may not easily use services, services by only a specific business operator are provided and there is a less chance of use in a general scene.

Moreover, when a password is used for a locking and unlocking system, there is a problem that it takes a lot of troubles to input the password by the user. Moreover, when a password is used for a locking and unlocking system, there are problems that the print cost is caused in a case where the user prints the password on a paper, and there is a risk that the password printed on the paper is peeked by others.

Moreover, when a magnetic card is used for a locking and unlocking system, there is a problem that the magnetic card is counterfeited. Moreover, when a common key authentication scheme is used for a locking and unlocking system, it is requested to safely share a key used for authentication in advance or use respective keys for a plurality of systems, that is, it is complicated to perform key switching management in apparatuses on the user side.

Therefore, a preferred embodiment of the present disclosure described below describes a technique that it is possible to safely authenticate the identical person and safely provide a service to the user without transmitting user's secret information to the operator side in the service that requests authentication of the identical person.

2. One Embodiment of the Present Embodiment (System Configuration Example)

First, an entire configuration example of an information processing system according to an embodiment of the present disclosure is described. FIG. 1 is an explanatory diagram illustrating an entire configuration example of the information processing system 1 according to an embodiment of the present disclosure. In the following, the entire configuration example of the information processing system 1 according to an embodiment of the present disclosure is described using FIG. 1.

As illustrated in FIG. 1, the information processing system 1 according to an embodiment of the present disclosure includes the client apparatus 100 and the server apparatus 200. As illustrated in FIG. 1, the client apparatus 100 and the server apparatus 200 are connected through the Internet, the Intranet or other networks 10.

The information processing system 1 according to an embodiment of the present disclosure denotes a system in which, when the user uses a service provided by the server apparatus 200, authentication of the user who tries to use it is performed using a public key authentication scheme or an digital signature scheme. The client apparatus 100 denotes an apparatus that generates a pair of keys including public key pk and secret key sk. Subsequently, in the case of using the service provided by the server apparatus 200, the client apparatus 100 transmits the user ID and only public key pk out of the generated pair of keys to the server apparatus 200.

The server apparatus 200 denotes an apparatus that performs user authentication by the public key authentication scheme or the digital signature scheme. The server apparatus 200 holds public key pk in advance, where public key pk is generated in the client apparatus 100 and registered from the client apparatus 100. Subsequently, the server apparatus 200 performs authentication of the user who tries to use a service, by the use of the user ID and public key pk corresponding to the user ID which are registered from the client apparatus 100 and secret key sk corresponding to public key pk generated in the client apparatus 100.

(Explanation of Public Key Authentication Scheme and Secret Key)

Next, a public key authentication scheme and a secret key are described. The public key authentication scheme denotes an authentication scheme to persuade other persons (verifier) that a certain person (prover) is the identical person by the use of public key pk and secret key sk. For example, public key $pk_A$ of prover A is published to the verifier. Meanwhile, secret key $sk_A$ of prover A is secretly managed by the prover. In the public key authentication scheme, a person who knows secret key $sk_A$ corresponding to public key $pk_A$ is regarded as prover A.

In a case where prover A tries to prove to verifier B that prover A is the identical person, prover A only have to execute a conversation protocol with verifier B and prove that prover A knows secret key $sk_A$ corresponding to public key $pk_A$. Subsequently, in a case where the conversation protocol proves to verifier B that prover A knows secret key $sk_A$, the validity of prover A (i.e., identical person) is proved.

Here, in order to secure the safety of the public key authentication scheme, following two conditions are requested.

The first condition is that the probability of perjury establishment by a perjurer who does not have secret key sk when a conversation protocol is executed is reduced as much as possible. Establishment of this first condition is referred to as "soundness." That is, it is paraphrased with "the perjury is not established by the perjurer who does not have secret key sk at a measurable probability in the conversation protocol having the soundness." The second condition is that all information on secret key $sk_A$ held by prover A does not leak to verifier B even if the conversation protocol is executed. Establishment of this second condition is referred to as "zero knowledge."

By using the conversation protocol having the above-mentioned soundness and zero knowledge, the safety of the public key authentication scheme is secured.

As illustrated in FIG. 13, a model of the public key authentication scheme includes two entities of a prover and a verifier. The prover generates a combination of peculiar secret key sk and public key pk unique to the prover, using key generation algorithm Gen. Next, the prover executes a conversation protocol with the verifier through the use of the combination of secret key sk and public key pk generated using key generation algorithm Gen. At this time, the prover executes the conversation protocol through the use of prover algorithm P. As described above, using prover algorithm P, the prover proves to the verifier that the prover owns secret key sk in the conversation protocol.

Meanwhile, the verifier executes the conversation protocol by the use of verifier algorithm V and verifies whether the prover owns a secret key supporting a public key published by the prover. That is, the verifier is an entity to verify whether the prover owns the secret key supporting the public key. Thus, the model of the public key authentication scheme includes two entities of the prover and the verifier, and three algorithms of key generation algorithm Gen, prover algorithm P and verifier algorithms V.

Also, in the following explanation, although expressions of "prover" and "verifier" are used, these expressions absolutely denote entities. Therefore, the subject that executes key generation algorithm Gen and prover algorithm P is an information processing apparatus corresponding to the entity of "prover." Similarly, the subject that executes verifier algorithm V is an information processing apparatus.

(Key Generation Algorithm Gen)

Key generation algorithm Gen is used by the prover. Also, Key generation algorithm Gen is an algorithm to generate a combination of secret key sk and public key pk unique to the prover. Public key pk generated by key generation algorithm Gen is published. Subsequently, published public key pk is used by the verifier. Meanwhile, the prover secretly manages secret key sk generated by key generation algorithm Gen. Subsequently, secret key sk which is secretly managed is used to prove to the verifier that secret key sk supporting public key pk is owned. Formally, key generation algorithm Gen receives an input of security parameter $1^{lambda}$ (where lambda is an integer equal to or greater than 0) and is expressed as Equation 1 listed below, as an algorithm to output secret key sk and public key pk.

[Math.1]

$$(sk, pk) \leftarrow Gen(1^\lambda) \quad (1)$$

(Prover Algorithm P)

Prover algorithm P is used by the prover. Subsequently, prover algorithm P is an algorithm to prove to the verifier that secret key sk supporting public key pk is owned. Prover algorithm P is defined as an algorithm to receive an input of secret key sk and public key pk of the prover and execute a conversation protocol with the verifier.

(Verifier Algorithm V)

Verifier algorithm V is used by the verifier. Subsequently, verifier algorithm V is an algorithm to verify whether the prover owns secret key sk supporting public key pk in the conversation protocol. Verifier algorithm V is defined as an algorithm to receive an input of public key pk of the prover and output 0 or 1 (1 bit) after executing the conversation protocol with the prover. Also, it is assumed that the prover is unauthorized in a case where the output is 0, and that the prover is authorized in a case where the output is 1. Formally, verifier algorithm V is expressed as Equation (2) listed below.

[Math.2]

$$0/1 \leftarrow V(pk) \quad (2)$$

As described above, the public key authentication scheme is requested to satisfy two conditions of the soundness and the zero knowledge in order to secure safety. However, in order to prove to the verifier that the prover owns secret key sk, the verifier is requested to perform procedures depending on secret key sk, notify the result to the verifier and then cause the verifier to perform verification based on the notification content. To perform the procedures depending on secret key sk is requested to assure the soundness. Meanwhile, even if the result of this procedure is notified to the verifier, it is requested not to leak all information on secret key sk to the verifier. Therefore, it is requested to design the above-mentioned key generation algorithm Gen, prover algorithm P and verifier algorithm V so as to satisfy these requirements.

Next, an outline of an algorithm of a digital signature scheme is described. FIG. 14 is an explanatory diagram to describe the outline of the algorithm of the digital signature scheme.

Unlike a paper document, it is not possible to seal or sign certain digital data. Therefore, in order to prove the creator of the digital data, a digital system is requested in which it is possible to acquire the same effect as a seal or signature on a paper document. This system is a digital signature. The digital signature denotes a system to associate signature data which only the creator of data knows and the data, provide them to the recipient and verify the signature data on the recipient side.

(Model)

As illustrated in FIG. 14, the model of the digital signature scheme includes two entities of a signer and a verifier. Also, the model of the digital signature scheme includes three algorithms of key generation algorithm Gen, signature generation algorithm Sig and signature verification algorithm Ver.

The signer generates a combination of signature key sk and verification key pk unique to the signer, by the use of key generation algorithm Gen. Moreover, the signer generates digital signature sigma assigned to document M by the use of signature generation algorithm Sig. That is, the signer is an entity that assigns a digital signature to document M. Meanwhile, the verifier verifies digital signature sigma assigned to document M by the use of signature verification algorithm Ver. That is, the verifier is an entity that verifies digital signature sigma to confirm whether the creator of document M is a signer.

Also, although expressions of "signer" and "verifier" are used in the following explanation, these expressions absolutely denote entities. Therefore, the subject that executes key generation algorithm Gen and signature generation algorithm Sig is an information processing apparatus corresponding to the entity of "signer". Similarly, the subject that executes signature verification algorithm Ver is an information processing apparatus.

(Key Generation Algorithm Gen)

Key generation algorithm Gen is used by the signer. Key generation algorithm Gen is an algorithm that generates a combination of signature key sk and verification key pk unique to the signer. Verification key pk generated by key generation algorithm Gen is published. Meanwhile, signature key sk generated by key generation algorithm Gen is secretly managed by the signer. Subsequently, signature key sk is used to generate digital signature sigma assigned to document M. For example, key generation algorithm Gen inputs security parameter $1^{lambda}$ (lambda is an integer equal to or greater than 0) and outputs signature key sk and public key pk. In this case, formally, key generation algorithm Gen can be expressed as Expression (3) listed below.

[Math.3]

$$(sk, pk) \leftarrow Gen(1^\lambda) \quad (3)$$

(Signature Generation Algorithm Sig)

Signature generation algorithm Sig is used by the signer. Signature generation algorithm Sig is an algorithm that generates digital signature sigma assigned to document M. Signature generation algorithm Sig is an algorithm that inputs signature key sk and document M and outputs digital signature sigma. Formally, this signature generation algorithm Sig can be expressed as Equation (4) listed below.

[Math.4]

$$\sigma \leftarrow Sig(sk, M) \quad (4)$$

(Signature Verification Algorithm Ver)

Signature verification algorithm Ver is used by verifier. Signature verification algorithm Ver is an algorithm that verifies whether digital signature sigma is a valid digital signature with respect to document M. Signature verification algorithm Ver is an algorithm that inputs verification key pk, document M and digital signature sigma of the signer and outputs 0 or 1 (1 bit). Formally, this signature verification algorithm Ver can be expressed as Equation (5) listed below. Here, in a case where algorithm Ver outputs 0 (i.e., in a case where public key pk refuses document M and digital signature sigma), the verifier determines that digital signature sigma is invalid, and, in a case where it outputs 1 (i.e., in a case where public key pk accepts document M and digital signature sigma), it determines that digital signature sigma is valid.

[Math.5]

$$0/1 \leftarrow Ver(pk, M, \sigma) \quad (5)$$

Here, although specific processing of the client apparatus 100 and the server apparatus 200 at the time of user authentication by the public key authentication scheme or the digital signature scheme is described below in detail, there is an example listed below. For example, at the time of user authentication, for example, the server apparatus 200 demands an input of the user ID to the client apparatus 100 in a web page.

The user who uses the client apparatus 100 inputs the user ID in the web page in response to the demand. To perform authentication by public key pk corresponding to the input user ID, the server apparatus 200 transmits a challenge message to the client apparatus 100.

The user who uses the client apparatus 100 answers the challenge message transmitted from the server apparatus 200, by the use of secret key sk generated in advance by the client apparatus 100. If the client apparatus 100 correctly answers the challenge message, the server apparatus 200 starts to provide a service to the user ID input by the client apparatus 100.

By adopting the configuration as illustrated in FIG. 1, the information processing system 1 according to an embodiment of the present disclosure can safely authenticate the identical person and safely provide a service to the user without transmitting user's secret information such as a password to the operator side of the service. Here, although FIG. 1 illustrates only one client apparatus 100 and one server apparatus 200, it is needless to say that the present disclosure is not limited to the example.

Moreover, although the example illustrated in FIG. 1 shows a case where an apparatus that generates a pair of keys and an apparatus that is subjected to user authentication are the same apparatus (client apparatus 100), the apparatus that generates a pair of keys and the apparatus that is subjected to user authentication may be different apparatuses.

FIG. 2 is an explanatory diagram illustrating an entire configuration example of the information processing system 1 according to an embodiment of the present disclosure. The example illustrated in FIG. 2 shows a case where an apparatus that generates the pair of keys and an apparatus that is subjected to user authentication are different apparatuses.

FIG. 2 illustrates two client apparatuses 100a and 100b and one server apparatus 200. Among 2 two client apparatus 100a and 100b illustrated in FIG. 2, the client apparatus 100a is an apparatus that generates a key pair of public key pk and secret key sk and registers public key pk in the server apparatus 200, and the client apparatus 100b is an apparatus that is subjected to user authentication in the public key authentication scheme or the digital signature scheme by the use of secret key sk generated by the client apparatus 100a. For example, in a case where the client apparatus 100a is a personal computer and the client apparatus 100*b* is a mobile device such as a smart phone, there is a possible configuration of the information processing system 1 as illustrated in FIG. 2.

As illustrated in FIG. 2, even if the apparatus that generates the key pair and the apparatus that is subjected to user authentication are different apparatuses, the information processing system 1 according to an embodiment of the present disclosure can safely authenticate the identical person and safely provide a service to the user without transmitting user's secret information such as a password to the operator side of the service.

Similarly, although the example illustrated in FIG. 1 illustrates a case when an apparatus that holds a public key generated by the client apparatus and an apparatus that performs user authentication are the same apparatus (i.e., the server apparatus 200), the apparatus that holds the public key generated by the client apparatus and the apparatus that performs user authentication according to the public key authentication scheme or the digital signature scheme may be different apparatuses.

FIG. 3 is an explanatory diagram illustrating an entire configuration example of the information processing system 1 according to an embodiment of the present disclosure. The example illustrated in FIG. 3 shows a case where the apparatus that holds the public key generated by the client apparatus and the apparatus that executes user authentication according to the public key authentication scheme or the digital signature scheme are different apparatuses in addition to a case where the apparatus that generates the key pair and the apparatus that is subjected to user authentication are different apparatuses as illustrated in FIG. 2.

FIG. 2 illustrates two client apparatus 100*a* and 100*b*, the server apparatus 200*a* and a verification apparatus 200*b*. Similar to FIG. 2, the client apparatus 100*a* is an apparatus that generates a key pair of public key pk and secret key sk and registers public key pk in the server apparatus 200, and the client apparatus 100*b* is an apparatus that is subjected to user authentication by the user of secret key sk generated by the client apparatus 100*a*. Moreover, the server apparatus 200*a* is an apparatus that holds public key pk generated by the client apparatus 100*a* and the verification apparatus 200*b* is an apparatus that performs user authentication according to the public key authentication scheme or the digital signature scheme by the use of public key pk held by the server apparatus 200*a*.

As illustrated in FIG. 3, even if the apparatus that generates the key pair and the apparatus that is subjected to user authentication are different apparatuses and the apparatus that holds the public key generated by the client apparatus and the apparatus that performs user authentication according to the public key authentication scheme or the digital signature scheme are different apparatuses, the information processing system 1 according to an embodiment of the present disclosure can safely authenticate the identical person and safely provide a service to the user without transmitting user's secret information such as a password to the operator side of the service.

The entire configuration example of the information processing system 1 according to an embodiment of the present disclosure has been described above. Next, a functional configuration example of the client apparatus according to an embodiment of the present disclosure is described.

(Configuration Example of Client Apparatus)

FIG. 4 is an explanatory diagram illustrating a functional configuration example of the client apparatus 100 according to an embodiment of the present disclosure. In the following, the functional configuration example of the client apparatus 100 according to an embodiment of the present disclosure is described using FIG. 4.

FIG. 4 illustrates a functional configuration example of the client apparatus 100 in a case where the apparatus that generates a pair of keys and the apparatus that is subjected to user authentication are the same apparatus. As illustrated in FIG. 4, the client apparatus 100 according to an embodiment of the present disclosure includes a key generation unit 110, a public key authentication processing unit 120 and a key pair preservation unit 130.

The key generation unit 110 generates a key pair of public key pk and secret key sk for user authentication according to the public key authentication scheme. The key generation unit 110 generates the key pair suitable for the public key authentication scheme, according to the public key authentication scheme to be used.

Also, in the present disclosure, the public key authentication scheme or the digital signature scheme is not limited to the specific one. For example, the one using the RSA encryption may be adopted or the one using the elliptic curve cryptosystem may be adopted. Moreover, for example, the public key authentication scheme or digital signature scheme that puts grounds of safety on the hardness of handling problems with respect to multidimensional multi-variable simultaneous equations, which is described in JP 2012-98690, may be used. The function used in the above reference is a function including m items of quadratic polynomials of n variables (where both m and n are integers equal to or greater than 2).

For example, to secure 80-bit safety, the key length of 1024 bits is requested in the case of the RSA encryption and the key length of 160 bits is requested even in the case of ECDSA. Meanwhile, in the case of the above-mentioned public key authentication scheme that puts grounds of safety on the hardness of handling problems with respect to multidimensional multivariable simultaneous equations, the key length of only 80 bits is requested to secure 80-bit safety. Therefore, in a case where the user registers a public key or is subjected to authentication by the use of a secret key in a service such as a web service, it is preferable to use the above-mentioned public key authentication scheme that puts grounds of safety on the hardness of handling problems with respect to multidimensional multivariable simultaneous equations, in which the number of characters input by the user decreases.

When generating the key pair of public key pk and secret key sk according to a key generation algorithm, the key generation unit 110 preserves the generated key pair in the key pair preservation unit 130. In the key pair generated by the key generation unit 110, when a service provided by the server apparatus 200 is used, public key pk is registered in the server apparatus 200 together with information (i.e., user ID) to identify the user. Subsequently, secret key sk is used when the user uses the service provided by the server apparatus 200.

When the user uses the service provided by the server apparatus 200, the public key authentication processing unit 120 performs authentication processing with the server apparatus 200 by the use of the public key authentication scheme or the digital signature scheme. At the time of authentication processing with the server apparatus 200, the public key authentication processing unit 120 uses public key pk registered in advance in the server apparatus 200 and secret key sk corresponding to this public key pk.

The key pair preservation unit 130 preserves the key pair of public key pk and secret key sk generated by the key generation unit 110. Public key pk preserved in the key pair preservation unit 130 is optionally sent to the server apparatus 200. Moreover, secret key sk preserved in the key pair preservation unit 130 is used at the time of authentication processing with the server apparatus 200 by the public key authentication processing unit 120.

Also, although FIG. 4 illustrates a functional configuration example of the client apparatus 100 when an apparatus that generates a pair of keys and an apparatus that is subjected to user authentication are the same apparatus, the present disclosure is not limited to the example as described above. That is, the apparatus that generates the pair of keys and the apparatus that is subjected to user authentication may be different apparatuses, and, in this case, the key generation unit 110 and the public key authentication processing unit 120 which are illustrated in FIG. 4 are installed in respective apparatuses. Here, in a case where the apparatus that generates the pair of keys and the apparatus that is subjected to user authentication are different apparatuses, the key pair preservation unit 130 illustrated in FIG. 4 may be installed in one of them or both of them.

The functional configuration example of the client apparatus 100 according to an embodiment of the present disclosure has been described using FIG. 4. Next, the functional configuration example of the server apparatus 200 according to an embodiment of the present disclosure is described.

(Configuration Example of Server Apparatus)

FIG. 5 is an explanatory diagram illustrating a functional configuration example of the server apparatus 200 according to an embodiment of the present disclosure. In the following, the functional configuration example of the server apparatus 200 according to an embodiment of the present disclosure is described using FIG. 5.

FIG. 5 illustrates a functional configuration example of the server apparatus 200 in a case where an apparatus that holds a public key generated by the client apparatus and an apparatus that performs user authentication according to the public key authentication scheme or the digital signature scheme are the same apparatus. As illustrated in FIG. 5, the server apparatus 200 according to an embodiment of the present disclosure includes a public key authentication processing unit 210 and a public key setting unit 220.

The public key authentication processing unit 210 performs authentication processing with the client apparatuses 100, by the use of the public key authentication scheme or the digital signature scheme. The public key authentication processing unit 210 is an example of a authentication information acquisition unit and authentication processing unit of the present disclosure. When performing authentication processing with client apparatuses 100 by the use of the public key authentication scheme or the digital signature scheme, the public key authentication processing unit 210 uses public key pk set to the public key setting unit 220. This public key pk is public key pk generated by the client apparatus 100.

The public key setting unit 220 holds public key pk generated by the client apparatus 100. The public key setting unit 220 links and holds public key pk generated by the client apparatus 100 and the user ID of the user who uses this public key pk. Here, a list of multiple users' public keys may be designated in the public key setting unit 220.

Also, in FIG. 5, although the functional configuration example of the server apparatus 200 has been described in a case where an apparatus that holds a public key generated by the client apparatus and an apparatus that performs user authentication according to the public key authentication scheme or the digital signature scheme are the same apparatus, the present disclosure is not limited to the example. That is, the apparatus that holds a public key generated by the client apparatus and the apparatus that performs user authentication according to the public key authentication scheme or the digital signature scheme may be different apparatuses, and, in this case, the public key authentication processing unit 210 and the public key setting unit 220 illustrated in FIG. 5 may be installed in respective apparatuses.

The functional configuration example of the server apparatus 200 according to an embodiment of the present disclosure has been described using FIG. 5. Next, an operation example of the information processing system 1 according to an embodiment of the present disclosure is described.

(Operation Example of Information Processing System)

(Registration of Public Key)

First, an explanation is given to an operation example when a pair of keys is generated in the client apparatus 100 and public key pk in the key pair is registered in the server apparatus 200. FIG. 6 is a flowchart illustrating the operation example of the information processing system 1 according to an embodiment of the present disclosure. The flowchart illustrated in FIG. 6 shows an operation example when a pair of keys is generated in the client apparatus 100 and public key pk in the key pair is registered in the server apparatus 200. In the following, the operation example of the information processing system 1 according to an embodiment of the present disclosure is described using FIG. 6.

The user who tries to use a service provided by the server apparatus 200 transmits the use application of the service to the server apparatus 200 by the use of the client apparatus 100 (step S101). The use application of this service is not limited to specific processing or method.

When there is the use application of the service from the client apparatus 100, the server apparatus 200 transmits a transmission request of information requested to use the service to the client apparatus 100 having transmitted the use application (step S102). Although this information requested to use the service is not limited to the specific one, for example, it may be the name, address or telephone number of the user who tries to use the service or the user ID which the user wants to use for the service.

When the user who tries to use the service provided by the server apparatus 200 receives the transmission request of the information requested to use the service in the client apparatus 100 from the server apparatus 200, in order to use the service, public key pk in a pair of keys generated in advance by the key generation unit 110 is transmitted from the client apparatus 100 to the server apparatus 200 and information (for example, user ID) requested to use other services is transmitted from the client apparatus 100 to the server apparatus 200 (step S103). For example, the public key authentication processing unit 120 transmits the information requested to use public key pk and the service, to the server apparatus 200. Therefore, the key pair of public key pk and secret key sk only has to be generated before the processing in this step S103.

When receiving public key pk and the information requested to use other services from the client apparatus 100, the server apparatus 200 performs user registration using those items of information and replies the registration result to the client apparatus 100 (step S104). Subsequently, the server apparatus 200 links public key pk transmitted from the client apparatus 100 and information (for example, user ID) to identify the user, and sets it to the public key setting unit 220.

By performing the processing as illustrated in FIG. 6 between the client apparatus 100 and the server apparatus 200, public key pk in the key pair generated in the key generation unit 110 of the client apparatus 100 can be registered in the public key setting unit 220 of the server apparatus 200. Subsequently, by registering public key pk in the public key setting unit 220 of the server apparatus 200 in this way, various kinds of authentication processing using public key pk are enabled without transmitting user's secret information to the server apparatus 200.

(User Authentication Processing Example (1))

Although an explanation has been given to an operation example at the time when a pair of keys is generated in the client apparatus 100 and public key pk in the key pair is registered in the server apparatus 200, a more specific authentication processing example is described. First, a user authentication processing example using a public key registered in the server is described.

FIG. 7 and FIG. 8 are explanatory diagrams illustrating user authentication processing examples using a public key registered in the server apparatus 200. FIG. 7 and FIG. 8 illustrates operation examples in a case where the user registers a public key in the server apparatus 200 in order to use a service provided by the server apparatus 200 and logs in the service provided by the server apparatus 200 by the use of a browser or the like.

First, a flow at the time of user registration is described. As illustrated in FIG. 7, the user generates a key pair of public key pk and secret key pk in the key generation unit 110 by the use of the client apparatus 100, inputs public key pk besides the user ID in the browser or the like at the time of user registration and registers the user ID and public key pk in the server apparatus 200. An input form that accepts an input of these user ID and public key pk is an example of the first input circuit of the present disclosure. The public key authentication processing unit 120 registers the user ID and public key pk in this server apparatus 200. This example shows a case where public key pk is "yyyy" and secret key pk is "xxxx." Subsequently, among these, the user manages secret key "xxxx" by oneself and registers public key "yyyy" in the server apparatus.

Next, a flow at the time of user authentication is described. As illustrated in FIG. 8, authentication by public key pk registered in the server apparatus 200 is performed at the time of user authentication. First, using the client apparatus 100, the user logs in a service provided by the server apparatus 200 by the use of a browser or the like. At this time, first, the user inputs the user ID as first illustrated in FIG. 8 and transmits the user ID from the client apparatus 100 to the server apparatus 200.

When receiving the user ID from the client apparatus 100, the server apparatus 200 starts user authentication processing using public key pk corresponding to the user ID. The server apparatus 200 transmits challenge message ch to the client apparatus 100 as user authentication processing. This challenge message ch is a message that can be answered if secret key sk corresponding to public key pk is known.

When challenge message ch is transmitted from the client apparatus 100, the user who is subjected to user authentication answers challenge message ch by inputting secret key sk (or a passphrase corresponding to secret key sk, for example) corresponding to public key pk registered in advance in the server apparatus 200 in the browser or the like or by automatically selecting secret key sk corresponding to pk from the key pair preservation unit 130 without inputting secret key sk by the user. Here, secret key sk (or a passphrase corresponding to secret key sk, for example) input by the user is not transmitted to the server apparatus 200 and is input to absolutely answer challenge message ch in the client apparatus 100. An input form that accepts an input of these user ID and secret key sk (or a passphrase corresponding to secret key sk, for example) is an example of a second input circuit of the present disclosure.

Subsequently, when secret key sk is input by the user, the client apparatus 100 answers challenge message ch transmitted from the server apparatus 200 in the public key authentication processing unit 120 and transmits the answer to the server apparatus 200. The server apparatus 200 confirms the answer transmitted from the client apparatus 100 and determines whether challenge message ch is correctly answered. When it is determined the challenge message ch is correctly answered, the server apparatus 200 starts to provide a service for the input user ID. Meanwhile, when it is determined the challenge message ch is not correctly answered, the server apparatus 200 refuses the provision of the service for the input user ID.

By performing such processing between the client apparatus 100 and the server apparatus 200, secure user authentication processing is enabled without transmitting secret key sk that is user's secret information to the server apparatus 200. This is because it is public key pk that is transmitted from the client apparatus 100 to the server apparatus 200, where there is no problem even if public key pk is leaked.

(User Authentication Processing Example (2))

Next, another user authentication processing example is described. Next, a case is described where user authentication is performed using a portable device such as a smartphone and an IC card.

FIG. 9 is an explanatory diagram illustrating a user authentication processing example using a public key registered in the server apparatus 200a according to an embodiment of the present disclosure. FIG. 9 illustrates a user authentication processing example using a public key in a case where an apparatus that generates a pair of keys and an apparatus that is subjected to authentication are different apparatuses and an apparatus in which a public key is registered and an apparatus that performs authentication processing are different apparatuses.

First, similar to above-mentioned user authentication processing example (1), the client apparatus 100a generates a pair of keys and sets public key pk to the server apparatus 200a at the time of user registration. Moreover, the client apparatus 100a sets secret key sk in the key pair generated by the client apparatus 100a to the client apparatus 100b corresponding to an apparatus that is subjected to authentication.

Subsequently, a service provider who provides a service sets a state in which public key pk set to the server apparatus 200a can be referred to from the verification apparatus 200b that confirms whether to permit providing the service to the user.

After that, using the client apparatus 100b, the user starts authentication processing with the verification apparatus 200b by the use of public key pk registered in advance in the server apparatus 200a. As an example of the place in which the verification apparatus 200b is installed, there are a ticket wicket of stations or the like and an entrance, gate or auditorium of facilities. Naturally, the place cited herein is one example and the present disclosure is not limited to the example.

For example, a case is assumed where the client apparatus 100b is an IC card in which near field communication by a specific frequency is possible and the verification apparatus 200b is an apparatus connected to a device in which the near field communication by the specific frequency is possible with the client apparatus 100b. In this case, authentication processing using public key pk may be started when the user holds the client apparatus 100b over the device connected to the verification apparatus 200b.

Moreover, for example, a case is assumed where the client apparatus 100b is an apparatus such as a mobile phone and a smartphone. In this case, for example, the user may be subjected to user authentication by performing wireless communication with the verification apparatus 200b by the use of the client apparatus 100b. At this time, secret key sk is not transmitted from the client apparatus 100b but an answer to the challenge message is transmitted.

Thus, even in a case where user authentication is performed using a device such as a smartphone and an IC card, user authentication is enabled without transmitting user's secret information to the service provider side.

(User Authentication Processing Example (3))

Next, another user authentication processing example is described. Next, an explanation is given to a processing example where the service provider side provides in advance user's data linked with a public key after user authentication to a service which the user tries to use, before the user uses it.

FIG. 10 is an explanatory diagram illustrating a user authentication processing example using a public key registered in the server apparatus 200 according to an embodiment of the present disclosure. FIG. 10 illustrates a processing example where the service provider side provides in advance user's data linked with a public key after user authentication to a service which the user tries to use, before the user uses it. Also, FIG. 10 illustrates a processing example where the user is subjected to an accommodation service of the hotel.

The user generates a key pair of public key pk and secret key sk in advance before enjoying the service and creates an account by registering the user ID and public key pk in the server apparatus 200. Subsequently, the user creates a hotel reservation using the created account. At the time of making a hotel reservation, the user transmits the user ID and public key to the hotel.

The hotel having accepted the reservation from the user demands data of the user to the server apparatus 200 such that the user can check in the hotel and enjoy various services (PC, game and fee-TV, and so on) when walking in a room. When the hotel demands data to the server apparatus 200, the user ID and public key pk used by the user at the time of reservation are used. In response to the demand from the hotel side, the server apparatus 200 provides the hotel with the data which the user uses at the hotel. However, the hotel provides the user with this data as data that is not allowed to be accessed unless the user has secret key sk in a pair of keys generated in advance by the user. Therefore, users other than the right user having secret key sk are not possible to illegally use the data provided from the server apparatus 200.

Afterwards, when the user checks in the hotel, by accessing data downloaded in advance by the hotel from the server apparatus 200 by the use of secret key sk generated in advance by the user, the user can safely use it. Here, by registering secret key sk in the client apparatus 100b that is a portable device as described above and using secret key sk at the time of using the data in a guest room at the hotel, data downloaded in advance from the server apparatus 200 by the hotel becomes available.

The information processing system according to an embodiment of the present disclosure does not have to transmit a password that is user's secret information to the service operator side and transmits a public key alone to the service operator side, where there is no influence even if the public key is leaked. In the information processing system according to an embodiment of the present disclosure, for example, even if it logs in a malicious site such as a fishing site, it is a public key that is stolen and there is no concern that secret information is stolen. Moreover, there is no problem if the information processing system according to an embodiment of the present disclosure registers the same public key for a plurality of services, and the burden of key management is reduced. Moreover, since the public key is not information that should be concealed, the cost of managing secret information on the service operator side decreases in the information processing system according to an embodiment of the present disclosure.

For example, when the public key authentication scheme or digital signature scheme that puts grounds of safety on the hardness of handling problems with respect to multidimensional multivariable simultaneous equations described in JP 2012-98690 is used, since the public key size becomes small, an effect of further reducing the trouble of operation and management and the improvement of a long-term safety level are expected. For example, in the operation aspect, the restriction of the display of the public key is small and an effect of shortening the length in which input/communication is possible is expected. Moreover, in the management aspect, since the public key size is short, the size to a database becomes small and an effect of enabling the key setting only by a copy operation of a character string is expected. In addition, in the safety aspect, since it is a scheme depending on a mathematical difficult problem, long-term safety is expected.

Expansion Example

As described above, an apparatus (the server apparatus 200 or the verification apparatus 200b) on the service provider side basically performs user authentication by performing communication with an apparatus (the client apparatus 100 or the client apparatus 100b) in which a secret key is stored. However, a case is assumed where the user loses or forgets an apparatus storing the secret key, and an apparatus on the service provider side may include an auxiliary input apparatus that can input the user's secret key by manual entry. Also, at this time, when the public key authentication scheme or digital signature scheme that puts grounds of safety on the hardness of handling problems with respect to multidimensional multivariable simultaneous equations described in JP 2012-98690 is used, since the secret key length is short (for at least 80 bits), an effect of excellent convenience at the time of manual entry is expected. Specifically, information for 80 bits corresponds to an input of alphanumeric uppercase and lowercase letters by about 20 characters. Therefore, an auxiliary input apparatus that can input about 20 characters may be installed in an apparatus on the service provider side.

Moreover, in a case where the user authentication scheme is the public key authentication scheme or digital signature scheme that puts grounds of safety on the hardness of handling problems with respect to multidimensional multivariable simultaneous equations, it is possible to implement the following convenience improvement methods by using that the length of a public key is short.

For example, a public key may be printed or displayed on a device carried by the user such that the user can visually check the public key. As a result, it is possible to perform manual entry, visual check and reading of a public key and there is an expected effect that a method at the time of user registration becomes intuitive. Here, at the time of display, the fingerprint (hash value or the like) of the public key may be displayed instead of displaying the entire content of the public key.

Moreover, by using the e-mail address in which a public key is embedded for the login ID of a service and by performing public key authentication by the use of the public key embedded in the e-mail address, whether the owner of the e-mail address (=login ID) logs in may be authenticated. To be more specific, by demanding the digital signature with respect to a message randomly selected to the user and verifying the validity, the service provider may confirm whether the user is the owner of the e-mail address (=login ID).

FIG. 11 is an explanatory diagram illustrating a user authentication processing example using a public key registered in the server apparatus 200 according to an embodiment of the present disclosure. FIG. 11 illustrates a processing example in a case where the e-mail address in which a public key is embedded is used and public key authentication is performed using the public key embedded in the mail address.

At the time of user registration, the user registers the e-mail address used for login and public key pk out of a pair of keys in the server apparatus 200 on the service provider side. At the time of user authentication, the server apparatus 200 on the service provider side transmits challenge message ch to the registered e-mail address.

The user who received the challenge message from the server apparatus 200 generates a signature with respect to the challenge message by the use of secret key sk and transmits the signature to the server apparatus 200 by the e-mail address registered in the server apparatus 200. By verifying whether the transmitted signature is valid, the server apparatus 200 can confirm whether the owner of the e-mail address (=login ID) has demanded the user authentication.

3: Example Hardware Configuration

Each algorithm described above can be performed by using, for example, the hardware configuration of the information processing apparatus illustrated in FIG. 12. That is, processing of each algorithm can be realized by controlling the hardware illustrated in FIG. 12 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As illustrated in FIG. 12, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is a storage for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is an apparatus for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is an apparatus that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or an apparatus for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4 Conclusion

According to an embodiment of the present disclosure as described above, without transmitting user's secret information such as a password to an apparatus on the service provider side like an existing web service, by transmitting a public key to an apparatus on the service provider side where there is no influence even if the public key is leaked, user registration and user authentication become possible. The user registration and the user authentication become possible without transmitting user's secret information to the apparatus on the service provider side, and therefore it is possible to reduce the cost of managing user's secret information for both the service provider side and the user side while it is possible to perform safe user authentication.

Although a preferred embodiment of the present disclosure has been described above in detail with reference to the accompanying drawings, the present disclosure is not limited to the example. It is clear that a person having normal knowledge in the technical field of the present disclosure can think of various modification examples or alternation examples within a range of the technical idea recited in the claims, and it is naturally understood that these belong to the technical scope of the present disclosure.

Additionally, the present technology may also be configured as below.

(1) An information processing apparatus including: circuitry configured to control a display to display a first user interface including a first input field configured to receive identification information and a second input field configured to receive a public key; and control transmitting identification information received at the first input field and a public key received at the second input field to another information processing apparatus for registration at the another information processing apparatus.

(2) The information processing apparatus of claim 1, wherein the circuitry is configured to generate the public key and a secret key.

(3) The information processing apparatus of (2), wherein the circuitry is configured to store the public key and the secret key.

(4) The information processing apparatus of any of (1) to (3), wherein the circuitry is configured to transmit a request to access a service to the another information processing apparatus.

(5) The information processing apparatus of (4), wherein the circuitry is configured to receive a request for information from the another information processing apparatus in response to the request to access the service.

(6) The information processing apparatus of (5), wherein the circuitry is configured to generate the public key in response to receiving the request for information from the another information processing apparatus.

(7) The information processing apparatus of any of (5) to (6), wherein the circuitry is configured to control the display to display the first user interface and control transmitting the identification information and the public key in response to receiving the request for information from the another information processing apparatus.

(8) The information processing apparatus of any of (1) to (7), wherein the first input field and the second input fields of the first user interface are character input fields configured to receive a user input entering characters into the first input field and the second input field.

(9) The information processing apparatus of any of (2) to (8), wherein the circuitry is configured to control the display to display a second user interface including a third input field configured to receive the identification information when performing authentication with the another information processing apparatus after the public key and the authentication information have been registered by the another information processing apparatus.

(10) The information processing apparatus of (9), wherein the circuitry is configured to control transmitting the identification information input to the second user interface to the another information processing apparatus.

(11) The information processing apparatus of (10), wherein the circuitry is configured to receive a challenge message from the another information processing apparatus in response to transmitting the identification information to the another information processing apparatus.

(12) The information processing apparatus of (11), wherein the circuitry is configured to control the display to display a third user interface including a fourth input field configured to receive at least one of the secret key and a passphrase corresponding to the secret key.

(13) The information processing apparatus of (12), wherein the circuitry is configured to generate a response to the challenge message received from the another information processing apparatus based on the at least one of the secret key and the passphrase corresponding to the secret key.

(14) The information processing apparatus of (13), wherein the circuitry is configured to transmit the response to the challenge message to the another information processing apparatus.

(15) The information processing apparatus of (14), wherein the circuitry is configured to control accessing a service provided by the another information processing apparatus when the another information processing apparatus determines that the challenge message is correctly answered.

(16) The information processing apparatus of any of (1) to (15), wherein the public key is a public key in a public key authentication scheme using multivariate quadratic polynomials.

(17) An information processing method performed by an information processing apparatus, the method including: controlling a display to display a user interface including a first input field configured to receive identification information and a second input field configured to receive a public key; and controlling a communication interface to transmit identification information received at the first input field and a public key received at the second input field to another information processing apparatus for registration at the another information processing apparatus.

(18) A non-transitory computer-readable medium including computer program instructions, which when executed by an information processing apparatus, cause the information processing apparatus to: control a display to display a user interface including a first input field configured to receive identification information and a second input field configured to receive a public key; and control transmitting identification information received at the first input field and a public key received at the second input field to another information processing apparatus for registration at the another information processing apparatus.

(19) An information processing apparatus including: circuitry configured to transmit instructions to another information processing apparatus instructing the another information processing apparatus to display a user interface including a first input field configured to receive identification information and a second input field configured to receive a public key; receive, from the another information processing apparatus, identification information input to the first input field and a public key received at the second input field; and register the identification information in association with the public key.

(20) An information processing method performed by an information processing apparatus, the method including: transmitting instructions to another information processing apparatus instructing the another information processing apparatus to display a user interface including a first input field configured to receive identification information and a second input field configured to receive a public key; receiving, from the another information processing apparatus, identification information input to the first input field and a public key received at the second input field; and registering the identification information in association with the public key.

(21) A non-transitory computer-readable medium including computer program instructions, which when executed by an information processing apparatus, cause the information processing apparatus to: transmit instructions to another information processing apparatus instructing the another information processing apparatus to display a user interface including a first input field configured to receive identification information and a second input field configured to receive a public key; receive, from the another information processing apparatus, identification information input to the first input field and a public key received at the second input field; and register the identification information in association with the public key.

(22) An information processing system including: a first information processing apparatus comprising circuitry configured to control a display to display a user interface including a first character input field configured to receive identification information and a second character input field configured to receive a public key; and control transmitting identification information received at the first character input field and a public key received at the second character input field to a second information processing apparatus; and the second information processing apparatus comprising circuitry configured to receive the identification information and the public key from the first information processing apparatus; and register the identification information in association with the public key.

(23) An information processing method including: displaying, by a first information processing apparatus, a user interface including a first character input field configured to receive identification information and a second character input field configured to receive a public key; transmitting, by the first information processing apparatus, identification information received at the first character input field and a public key received at the second character input field to a second information processing apparatus; receiving, by the second information processing apparatus, the identification information and the public key from the first information processing apparatus; and registering, by the second information processing apparatus, the identification information in association with the public key.

Additionally, the present technology may also be configured as below.

(1)

An information processing apparatus including:

a first input unit that accepts an input of user identification information to identify a user and a public key used in a public key authentication scheme;

a registration unit that registers the user identification information and the public key in a verifier;

a second input unit that accepts an input of the user identification information and a secret key corresponding to the public key when causing the verifier to perform user authentication; and an authentication processing unit that provides an answer to the verifier using the secret key corresponding to the public key.

(2)

The information processing apparatus according to (1), further including:

a key generation unit that generates a pair of the public key and the secret key which are registered in the verifier, wherein the registration unit registers the public key generated by the key generation unit in the verifier and the authentication processing unit uses the secret key generated by the key generation unit when causing the verifier to perform user authentication.

(3)

The information processing apparatus according to (1) or (2), wherein the registration unit registers the public key generated by a different apparatus in the verifier and the authentication processing unit uses the secret key generated by the different apparatus when causing the verifier to perform user authentication.

(4)

The information processing apparatus according to any one of (1) to (3), wherein the registration unit registers an e-mail address which partially includes the public key as the user identification information in the verifier.

(5)

The information processing apparatus according to any one of (1) to (4), wherein the public key authentication scheme is a public key authentication scheme in which the public key is generated using a function including m items of a quadratic polynomial of n variables (where both m and n are integers equal to or greater than 2).

(6)

An information processing apparatus including:

an authentication information acquisition unit that acquires user identification information to identify a user and a public key used in a public key authentication scheme which are registered by a prover; and an authentication processing unit that performs user authentication using the user identification information input from a user and the public key corresponding to the user identification information acquired by the authentication information acquisition unit.

(7)

The information processing apparatus according to (6), wherein the authentication processing unit provides data to be used by the user when performing user authentication to authenticate the user.

(8)

The information processing apparatus according to (7), wherein the authentication processing unit provides the data in an encrypted state using the public key used for user authentication.

(9)

The information processing apparatus according to any one of (6) to (8), wherein, in a case where an e-mail address which partially includes the public key as the user identification information is registered, the authentication processing unit transmits a message for authentication to the e-mail address excluding a part of the public key.

(10)

An information processing system including:

a first information processing apparatus that demands user authentication; and a second information processing apparatus that performs user authentication using information transmitted from the first information processing apparatus, wherein the first information processing apparatus includes a first authentication processing unit that registers user identification information to identify a user and a public key used in a public key authentication scheme in the second information processing apparatus by causing the user to input the user identification information and the public key, causes the user to input the user identification information and a secret key corresponding to the public key when causing the second information processing apparatus to perform user authentication, and provides an answer to the second information processing apparatus using the secret key corresponding to the public key, and wherein the second information processing apparatus includes a second authentication processing unit that performs user authentication using the user identification information and the public key which are input from the user of the first information processing apparatus, using the user identification information to identify the user and the public key used in the public key authentication scheme which are registered by the first information processing apparatus.

(11)
An information processing method including:
accepting an input of user identification information to identify a user and a public key used in a public key authentication scheme;
registering the user identification information and the public key in a verifier;
accepting an input of the user identification information and a secret key corresponding to the public key when causing the verifier to perform user authentication; and
providing an answer to the verifier using the secret key corresponding to the public key.

(12)
An information processing method including:
acquiring user identification information to identify a user and a public key used in a public key authentication scheme which are registered by a prover; and
performing user authentication using the user identification information input from a user and the public key corresponding to the user identification information acquired in the authentication information acquisition step.

(13)
A computer program that causes a computer to execute:
accepting an input of user identification information to identify a user and a public key used in a public key authentication scheme;
a registration step of registering the user identification information and the public key in a verifier;
accepting an input of the user identification information and a secret key corresponding to the public key when causing the verifier to perform user authentication; and
providing an answer to the verifier using the secret key corresponding to the public key.

(14)
A computer program that causes a computer to execute:
acquiring user identification information to identify a user and a public key used in a public key authentication scheme which are registered by a prover; and
performing user authentication using the user identification information input from a user and the public key corresponding to the user identification information acquired in the authentication information acquisition step.

REFERENCE SIGNS LIST 1 information processing system
10 network
100 client apparatus
100a: client apparatus
100b client apparatus
110 key generation unit
120 public key authentication processing unit
130 key pair preservation unit
200 server apparatus
200a server apparatus
200b verification apparatus
210 public key authentication processing unit
220 public key setting unit

The invention claimed is:

1. An information processing apparatus comprising:
circuitry configured to
generate a public key;
generate a secret key paring with the public key;
control a display to display the public key such that a user can visually check the public key;
control the display to display a first user interface including a first input field configured to receive a user input of typing in a first character string of identification information of the user, the identification information being an e-mail address, and a second input field configured to receive a user input of typing in a second character string of the generated and displayed public key;
control transmitting the e-mail address received at the first input field and the public key received at the second input field to another information processing apparatus for registration at the another information processing apparatus;
after the registration at the another information processing apparatus, receive, at the e-mail address, a challenge message from the another information processing apparatus in response to transmitting the e-mail address and the public key to the another information processing apparatus, the challenge message being transmitted to the information processing apparatus using the e-mail address registered in the another information processing apparatus together with the public key;
in response to receiving the challenge message, generate a signature with respect to the challenge message using the generated secret key paring with the public key;
transmit the signature to the another information processing apparatus for registration of the e-mail address and the public key at the another information processing apparatus such that the another information processing apparatus can verify the signature by the public key, the signature being generated using the secret key pairing with the public key;
transmit a request to access a service to the another information processing apparatus;
receive a request for information from the another information processing apparatus in response to the request to access the service; and
control transmitting the e-mail address and the public key in response to receiving the request for information from the another information processing apparatus.

2. The information processing apparatus of claim 1, wherein the circuitry is configured to store the public key and the secret key.

3. The information processing apparatus of claim 1, wherein the circuitry is configured to generate the public key in response to receiving the request for information from the another information processing apparatus.

4. The information processing apparatus of claim 1, wherein the circuitry is configured to control the display to display the first user interface.

5. The information processing apparatus of claim 1, wherein the first input field and the second input fields of the first user interface are character input fields configured to receive a user input entering characters into the first input field and the second input field.

6. The information processing apparatus of claim 1, wherein the circuitry is configured to control the display to display a second user interface including a third input field configured to receive the identification information when performing authentication with the another information processing apparatus after the public key and the identification information have been registered by the another information processing apparatus.

7. The information processing apparatus of claim 1, wherein the circuitry is configured to control the display to display a third user interface including a fourth input field configured to receive at least one of the secret key and a passphrase corresponding to the secret key.

8. The information processing apparatus of claim 7, wherein the circuitry is configured to generate a response to the challenge message received from the another information processing apparatus based on the at least one of the secret key and the passphrase corresponding to the secret key.

9. The information processing apparatus of claim 8, wherein the circuitry is configured to transmit the response to the challenge message to the another information processing apparatus.

10. The information processing apparatus of claim 9, wherein the circuitry is configured to control accessing a service provided by the another information processing apparatus when the another information processing apparatus determines that the challenge message is correctly answered.

11. The information processing apparatus of claim 1, wherein the public key is a public key in a public key authentication scheme using multivariate quadratic polynomials.

12. The information processing apparatus of claim 1, wherein the public key is generated using a function including m items of a quadratic polynomial of n variables, where both m and n are integers equal to or greater than 2.

13. The information processing apparatus of claim 1, wherein the public key is a public key in a public key authentication scheme or a digital signature scheme that puts grounds of safety on hardness of handling problems with respect to multidimensional multivariable simultaneous equations.

14. An information processing method performed by an information processing apparatus, the method comprising:
generating, using circuitry, a public key;
generating, using the circuitry, a secret key paring with the public key;
controlling a display to display the public key such that a user can visually check the public key;
controlling the display to display a user interface including a first input field configured to receive a user input of typing in a first character string of identification information, the identification information being an e-mail address, and a second input field configured to receive a user input of typing in a second character string of the generated and displayed public key;
controlling a communication interface to transmit the e-mail address received at the first input field and the public key received at the second input field to another information processing apparatus for registration at the another information processing apparatus;
after the registration at the another information processing apparatus, receiving, at the e-mail address, a challenge message from the another information processing apparatus in response to transmitting the e-mail address and the public key to the another information processing apparatus, the challenge message being transmitted to the information processing apparatus using the e-mail address registered in the another information processing apparatus together with the public key;
in response to receiving the challenge message, generating a signature with respect to the challenge message using the generated secret key paring with the public key;
transmitting the signature to the another information processing apparatus for registration of the e-mail address and the public key at the another information processing apparatus such that the another information processing apparatus can verify the signature by the public key, the signature being generated using the secret key pairing with the public key;
transmitting a request to access a service to the another information processing apparatus;
receiving a request for information from the another information processing apparatus in response to the request to access the service; and
controlling transmitting the e-mail address and the public key in response to receiving the request for information from the another information processing apparatus.

15. A non-transitory computer-readable medium including computer program instructions, which when executed by an information processing apparatus, cause the information processing apparatus to:
generate a public key;
generate a secret key paring with the public key;
control a display to display the public key such that a user can visually check the public key;
control the display to display a user interface including a first input field configured to receive a user input of typing in a first character string of identification information of the user, the identification information being an e-mail address, and a second input field configured to receive a user input of typing in a second character string of the generated and displayed public key;
control transmitting the e-mail address received at the first input field and the public key received at the second input field to another information processing apparatus for registration at the another information processing apparatus;
after the registration at the another information processing apparatus, receive, at the e-mail address, a challenge message from the another information processing apparatus in response to transmitting the e-mail address and the public key to the another information processing apparatus, the challenge message being transmitted to the information processing apparatus using the e-mail address registered in the another information processing apparatus together with the public key;
in response to receiving the challenge message, generate a signature with respect to the challenge message using the generated secret key paring with the public key;
transmit the signature to the another information processing apparatus for registration of the e-mail address and the public key at the another information processing apparatus such that the another information processing apparatus can verify the signature by the public key, the signature being generated using the secret key pairing with the public key;

transmit a request to access a service to the another information processing apparatus;

receive a request for information from the another information processing apparatus in response to the request to access the service; and control transmitting the e-mail address and the public key in response to receiving the request for information from the another information processing apparatus.

16. An information processing apparatus comprising:
circuitry configured to transmit instructions to another information processing apparatus instructing the another information processing apparatus to display a user interface including a first input field configured to receive a user input of typing in a first character string of identification information of a user, the identification information being an e-mail address, a second input field configured to receive a user input of typing in a second character string of a public key generated by the another information processing apparatus, and the public key;

receive, from the another information processing apparatus, the e-mail address input to the first input field and the public key input to the second input field;

transmit, using the e-mail address, a challenge message to the another information processing apparatus in response to receiving the e-mail address and the public key from the another information processing apparatus;

receive a signature with respect to the challenge message from the another information processing apparatus, the signature being generated by the another information processing apparatus using a secret key paring with the public key, the secret key being generated by the another information processing apparatus;

verify the signature by the public key, the signature being generated by the another information processing apparatus using the secret key pairing with the public key;

register the e-mail address in association with the public key in case the signature is correctly verified by the public key;

receive a request to access a service from the another information processing apparatus; and transmit a request to transmit the e-mail address and the public key to the another information processing apparatus in response to the request to access the service from another information processing apparatus.

17. An information processing method performed by an information processing apparatus, the method comprising:

transmitting, using circuitry, instructions to another information processing apparatus instructing the another information processing apparatus to display a user interface including a first input field configured to receive a user input of typing in a first character string of identification information of a user, the identification information being an e-mail address, a second input field configured to receive a user input of typing in a second character string of a public key generated by the another information processing apparatus, and the public key;

receiving, from the another information processing apparatus, the e-mail address input to the first input field and the public key input to the second input field;

transmitting, using the e-mail address, a challenge message to the another information processing apparatus in response to receiving the e-mail address and the public key from the another information processing apparatus;

receiving a signature with respect to the challenge message from the another information processing apparatus, the signature being generated by the another information processing apparatus using a secret key paring with the public key, the secret key being generated by the another information processing apparatus;

verifying the signature by the public key, the signature being generated by the another information processing apparatus using the secret key pairing with the public key;

registering the e-mail address in association with the public key in case the signature is correctly verified by the public key;

receiving a request to access a service from the another information processing apparatus; and transmitting a request to transmit the e-mail address and the public key to the another information processing apparatus in response to the request to access the service from another information processing apparatus.

18. A non-transitory computer-readable medium including computer program instructions, which when executed by an information processing apparatus, cause the information processing apparatus to:

transmit instructions to another information processing apparatus instructing the another information processing apparatus to display a user interface including a first input field configured to receive a user input of typing in a first character string of identification information of a user, the identification information being an e-mail address, a second input field configured to receive a user input of typing in a second character string of a public key generated by the another information processing apparatus, and the public key;

receive, from the another information processing apparatus, the e-mail address input to the first input field and the public key input to the second input field;

transmit, using the e-mail address, a challenge message to the another information processing apparatus in response to receiving the e-mail address and the public key from the another information processing apparatus;

receive a signature with respect to the challenge message from the another information processing apparatus, the signature being generated by the another information processing apparatus using a secret key paring with the public key, the secret key being generated by the another information processing apparatus;

verify the signature by the public key, the signature being generated by the another information processing apparatus using the secret key pairing with the public key;

register the e-mail address in association with the public key in case the signature is correctly verified by the public key;

receive a request to access a service from the another information processing apparatus; and transmit a request to transmit the e-mail address and the public key to the another information processing apparatus in response to the request to access the service from another information processing apparatus.

19. An information processing system comprising:
a first information processing apparatus comprising first circuitry configured to
generate a public key;
generate a secret key paring with the public key;
control a display to display the public key such that a user can visually check the public key;
control the display to display a user interface including a first character input field configured to receive a user input of typing in a first character string of identification information of the user, the identification information being an e-mail address, and a second character input field configured to receive a user input of typing in a second character string of the generated and displayed public key;
control transmitting the e-mail address received at the first character input field and the public key received at the second character input field to a second information processing apparatus;
after the registration at the second information processing apparatus, receive, at the e-mail address, a challenge message from the another information processing apparatus in response to transmitting the e-mail address and the public key to the second information processing apparatus, the challenge message being transmitted to the first information processing apparatus using the e-mail address registered in the second information processing apparatus together with the public key;
in response to receiving the challenge message, generate a signature with respect to the challenge message using the generated secret key paring with the public key;
transmit the signature to the second information processing apparatus for registration of the e-mail address and the public key at the second information processing apparatus such that the second information processing apparatus can verify the signature by the public key, the signature being generated using the secret key pairing with the public key;
transmit a request to access a service to the second information processing apparatus;
receive a request for information from the second information processing apparatus in response to the request to access the service; and
control transmitting the e-mail address and the public key in response to receiving the request for information from the second information processing apparatus; and
the second information processing apparatus comprising second circuitry configured to
receive the e-mail address and the public key from the first information processing apparatus;
transmit, using the e-mail address, a challenge message to the first information processing apparatus in response to receiving the e-mail address and the public key from the first information processing apparatus;
receive a signature with respect to the challenge message from the first information processing apparatus, the signature being generated by the first information processing apparatus using the secret key paring with the public key, the secret key being generated by the first information processing apparatus;

verify the signature by the public key, the signature being generated by the first information processing apparatus using the secret key pairing with the public key;
register the e-mail address in association with the public key in case the signature is correctly verified by the public key;
receive the request to access the service from the first information processing apparatus; and
transmit the request for information to the first information processing apparatus in response to the request to access the service from first information processing apparatus.

20. An information processing method comprising:
generating, by a first information processing apparatus, a public key;
generating, by the first information processing apparatus, a secret key paring with the public key;
controlling a display of the first information processing apparatus to display the public key such that a user can visually check the public key;
controlling the display to display a user interface including a first character input field configured to receive a user input of typing in a first character string of identification information of the user, the identification information being an e-mail address, and a second character input field configured to receive a user input of typing in a second character string of the generated and displayed public key;
transmitting, by the first information processing apparatus, the e-mail address received at the first character input field and the public key received at the second character input field to a second information processing apparatus;
after the registration at the second information processing apparatus, receiving, by the first information processing apparatus, at the e-mail address, a challenge message from the another information processing apparatus in response to transmitting the e-mail address and the public key to the second information processing apparatus, the challenge message being transmitted to the first information processing apparatus using the e-mail address registered in the second information processing apparatus together with the public key;
in response to receiving the challenge message, generating, by the first information processing apparatus, a signature with respect to the challenge message using the generated secret key paring with the public key;
transmitting, by the first information processing apparatus, the signature to the second information processing apparatus for registration of the e-mail address and the public key at the second information processing apparatus such that the second information processing apparatus can verify the signature by the public key, the signature being generated using the secret key pairing with the public key;
transmitting, by the first information processing apparatus, a request to access a service to the second information processing apparatus;
receiving, by the first information processing apparatus, a request for information from the second information processing apparatus in response to the request to access the service;
controlling, by the first information processing apparatus, transmitting the e-mail address and the public key in response to receiving the request for information from the second information processing apparatus;

receiving, by the second information processing apparatus, the e-mail address and the public key from the first information processing apparatus;

transmitting, by the second information processing apparatus, using the e-mail address, a challenge message to the first information processing apparatus in response to receiving the e-mail address and the public key from the first information processing apparatus;

verifying, by the second information processing apparatus, the signature by the public key, the signature being generated by the first information processing apparatus using the secret key pairing with the public key;

receiving, by the second information processing apparatus, a signature with respect to the challenge message from the first information processing apparatus, the signature being generated by the first information processing apparatus using the secret key paring with the public key, the secret key being generated by the first information processing apparatus;

registering, by the second information processing apparatus, the e-mail address in association with the public key in case the signature is correctly verified by the public key;

receiving, by the second information processing apparatus, the request to access the service from the first information processing apparatus; and transmitting, by the second information processing apparatus, the request for information to the first information processing apparatus in response to the request to access the service from first information processing apparatus.

\* \* \* \* \*